(12) United States Patent  
Sato

(10) Patent No.: US 9,301,135 B2  
(45) Date of Patent: Mar. 29, 2016

(54) CONTROL SYSTEM INCLUDING DEVICE AND OBJECT DEVICE TO BE CONTROLLED

(71) Applicant: BUFFALO INC., Nagoya-shi (JP)

(72) Inventor: Masahiro Sato, Nagoya (JP)

(73) Assignee: BUFFALO INC., Nagoya-shi (JP)

( * ) Notice: Subject to any disclaimer, the term of this patent is extended or adjusted under 35 U.S.C. 154(b) by 0 days.

(21) Appl. No.: 14/635,874

(22) Filed: Mar. 2, 2015

(65) Prior Publication Data

US 2015/0249919 A1 Sep. 3, 2015

(30) Foreign Application Priority Data

Mar. 3, 2014 (JP) ................ 2014-040299  
Dec. 19, 2014 (JP) ................ 2014-257008

(51) Int. Cl.
| | |
|---|---|
| H04M 3/16 | (2006.01) |
| H04W 12/04 | (2009.01) |
| H04W 4/02 | (2009.01) |
| H04W 12/08 | (2009.01) |

(52) U.S. Cl.
CPC ............ *H04W 12/04* (2013.01); *H04W 4/02* (2013.01); *H04W 12/08* (2013.01)

(58) Field of Classification Search
CPC . H04W 12/06; H04W 8/245; H04M 1/72519; H04L 63/08
USPC ............. 455/411, 419, 550.1; 726/3
See application file for complete search history.

(56) References Cited

U.S. PATENT DOCUMENTS

| | | | | |
|---|---|---|---|---|
| 8,676,237 B1* | 3/2014 | Gupta | ............ | H04W 4/003 455/411 |
| 8,745,277 B2* | 6/2014 | Kan | ............ | G06F 13/4221 710/13 |
| 9,163,909 B2* | 10/2015 | Chengalva | ............ | F41H 7/005 |
| 2008/0120688 A1* | 5/2008 | Qiu | ............ | G06F 21/552 726/1 |
| 2008/0129445 A1* | 6/2008 | Kraimer | ............ | B66F 9/07581 340/5.2 |
| 2009/0052348 A1 | 2/2009 | Kato et al. | | |
| 2012/0249289 A1* | 10/2012 | Freese | ............ | G08C 17/00 340/5.7 |
| 2012/0249466 A1* | 10/2012 | Ito | ............ | G08C 17/02 345/173 |
| 2013/0047216 A1 | 2/2013 | Ajitomi et al. | | |
| 2013/0067536 A1 | 3/2013 | Takahashi et al. | | |
| 2013/0251373 A1 | 9/2013 | Yano et al. | | |
| 2013/0292460 A1* | 11/2013 | Hunter | ............ | H04L 67/125 235/375 |
| 2015/0180880 A1* | 6/2015 | Nakano | ............ | G08C 17/02 726/4 |

FOREIGN PATENT DOCUMENTS

| | | |
|---|---|---|
| JP | 2001-218282 | 8/2001 |
| JP | 2003-244776 | 8/2003 |
| JP | 2008-098893 | 4/2008 |

(Continued)

*Primary Examiner* — Danh Le  
(74) *Attorney, Agent, or Firm* — Oblon, McClelland, Maier & Neustadt, L.L.P.

(57) ABSTRACT

A device that includes circuitry configured to: perform first communication that is proximity wireless communication with a communication device; perform second communication with the communication device; perform third communication with an object device; store a first access key; send the first access key to the communication device by the first communication; receive a second access key from the communication device; receive a control command for controlling the object device from the communication device; and send the received control command to the object device in the case that the received second access key is determined to be valid.

20 Claims, 16 Drawing Sheets

(56) References Cited

FOREIGN PATENT DOCUMENTS

| | | |
|---|---|---|
| JP | 2009-135865 | 6/2009 |
| JP | 2012-134837 | 7/2012 |
| JP | 2012-516133 | 7/2012 |
| JP | 2013-041408 | 2/2013 |
| JP | 2013-054486 | 3/2013 |
| JP | 2013-057583 | 3/2013 |
| JP | 2013-059247 | 3/2013 |
| JP | 2013-198100 | 9/2013 |
| WO | 2010/085816 | 7/2010 |

* cited by examiner

Fig.3

| No. | DEVICE TYPE | MODEL NUMBER | CONTROL ITEM | SETTING RANGE | CONTROL COMMAND |
|---|---|---|---|---|---|
| 1 | LIGHTING DEVICE | AAAAA | OPERATION | ON/OFF | aaaa |
| 2 | AIR CONDITIONER | BBBBB | OPERATION | ON/OFF | bbbb |
|   |   |   | DRIVE MODE | COOLING/ HEATING/ DEHUMIDIFICATION | cccc |
|   |   |   | TARGET TEMPERATURE | 15°C~30°C | dddd |

| No. | CONTROL TERMINAL | DEVICE TYPE | MODEL NUMBER | CONTROL ITEM | SETTING RANGE | CONTROL COMMAND |
|---|---|---|---|---|---|---|
| 1 | ALL | LIGHTING DEVICE | AAAAA | OPERATION | ON/OFF | aaaa |
| 2 | ALL | AIR CONDITIONER | BBBBB | OPERATION | ON/OFF | bbbb |
| | | | | DRIVE MODE | COOLING/ HEATING/ DEHUMIDIFICATION | cccc |
| | | | | TARGET TEMPERATURE | 15°C-30°C | dddd |
| 3 | PRIMARY | TV SET | CCCCC | OPERATION | ON/OFF | eeee |
| | | | | CHANNEL | 1-15 | ffff |
| | | | | VOLUME | 1-30 | gggg |

CONTROL SYSTEM INCLUDING DEVICE AND OBJECT DEVICE TO BE CONTROLLED

CROSS-REFERENCE TO RELATED APPLICATIONS

The present application claims priority from Japanese Patent Application No. 2014-40299 filed on Mar. 3, 2014 and Japanese Patent Application No. 2014-257008 filed on Dec. 19, 2014, the entirety of disclosure of which is hereby incorporated by reference into this application.

TECHNICAL FIELD

The disclosure relates to remote control of an object device to be controlled using a mobile communication terminal.

BACKGROUND ART

A control system has been proposed to use a mobile communication terminal such as a smartphone or a tablet computer as a controller for remote control of various electric appliances such as a TV set and an air conditioner placed in home.

When the mobile communication terminal is used as the controller, there is a need to limit a time period when the mobile communication terminal is available as the controller. For example, in a hotel or a condominium, it is convenient to use the mobile communication terminal of a guest as the controller for devices in a guest room such as a lighting device and an air conditioner only in a limited time period from a check-in to a check-out of the guest.

Simply providing the mobile communication terminal with the functions for using the mobile communication terminal as the controller, however, may cause a problem that the mobile communication terminal of the guest may be operated as the controller even after the check-out. For example, after a check-in of a next guest, the devices in the guest room may be subjected to control different from the next guest's intention.

Accordingly a technique of allowing the mobile communication terminal to be used as the controller only temporarily has been demanded. This problem is not limited to accommodation facilities but may also arise in any case using the mobile communication terminal of each user as the controller in theme parks and playgrounds.

SUMMARY

In order to solve at least part of the problems described above, the disclosure may be implemented by aspects described below.

According to one aspect of the disclosure, there is provided a device that includes circuitry configured to: perform first communication that is proximity wireless communication with a communication device; perform second communication that is different from the proximity wireless communication with the communication device; perform third communication with an object device; store a first access key; send the first access key to the communication device by the first communication; receive a second access key from the communication device by the second communication; receive a control command for controlling the object device from the communication device by the second communication; and send the received control command received from the communication device, to the object device by the third communication in the case that the received second access key is determined to be valid.

The disclosure may be implemented by any of various other aspects. These other aspects include, for example, a method of controlling an object device to be controlled by using a control system, a computer program product of implementing functions of the wireless relay device and a non-transitory storage medium in which such a computer program is stored.

BRIEF DESCRIPTION OF DRAWINGS

FIG. 3 is a diagram schematically showing a configuration example of the device control information of the lighting device 400a and the air conditioner 400b;

DESCRIPTION OF EMBODIMENTS

A. First Embodiment

A-1. System Configuration

Figure 1:
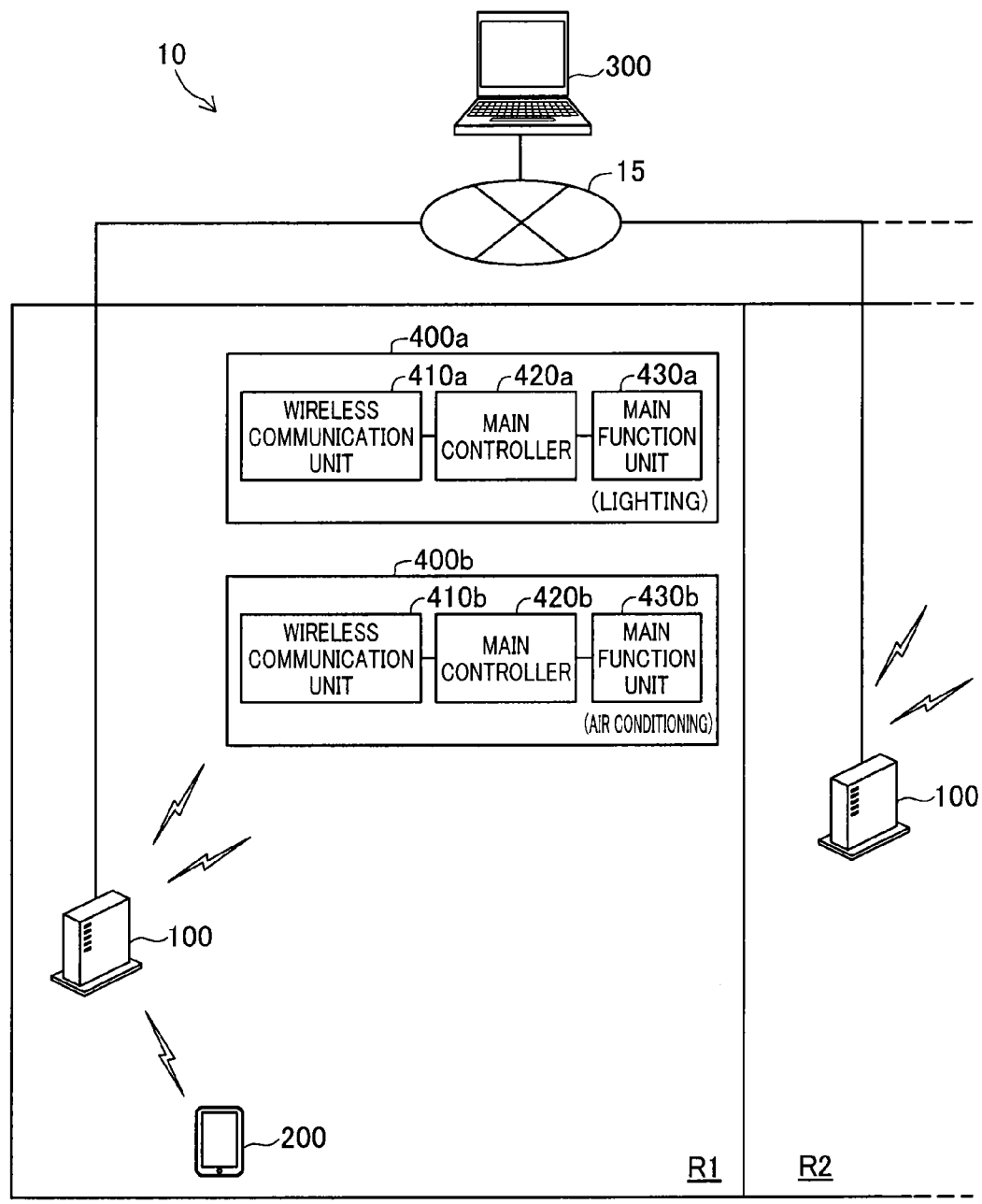
FIG. 1 is a diagram illustrating the general configuration of a control system 10 according to the first embodiment of the disclosure.

FIG. 1 is a diagram illustrating the general configuration of a control system 10 according to the first embodiment of the disclosure. The control system 10 of the first embodiment is placed in a hotel and is provided as a system of controlling electric appliances (lighting device 400a and an air conditioner 400b described below) located in each room using mobile communication terminals of hotel guests. The illustrated example of FIG. 1 shows two adjacent rooms R1 and R2. The respective rooms have substantially the same configurations of the system 10 and the electric appliances, and the following describes the configuration of the room R1 as an example.

A lighting device 400a and an air conditioner 400b are located in the room R1. The lighting device 400a includes a wireless communication unit 410a, a main controller 420a and a main function unit 430a. The wireless communication unit 410a performs wireless communication with a wireless relay device 100 described later. For example, any of Z-Wave (registered trademark), Zigbee (registered trademark), Bluetooth (registered trademark), various wireless LANs (Local Area Networks) specified in IEEE (The Institute of Electrical and Electronics Engineers) 802.11, other standardized communication systems and any unstandardized communication systems may be employed for such wireless communication. A communication system in conformity with ECHONET Lite is preferable as the communication system for wireless communication between the wireless communication unit 410a and the wireless relay device 100 described above. The main controller 420a is connected with the wireless communication unit 410a and the main function unit 430a and controls the entire lighting device 400a. The main function unit 430a is a function unit to perform a lighting function which is the main function of the lighting device 400a. The air conditioner 400b includes a wireless communication unit 410b, a main controller 420b and a main function unit 430b. The wireless communication unit 410b is similar to the above wireless communication unit 410a and is thus not described in detail herein. The main controller 420b is connected with the wireless communication unit 410b and the main function unit 430b and controls the entire air conditioner 400b. The main function unit 430b is a function unit to perform an air conditioning function which is the main function of the air conditioner 400b.

The control system 10 includes a wireless relay device 100 located in each room, a mobile communication terminal 200 owned by a guest who stays in each room, a management device 300 and a hotel LAN 15. The wireless relay device 100 is capable of performing wireless communication (for example, Z-Wave (registered trademark) or Zigbee (registered trademark) with the lighting device 400a and the air conditioner 400b described above. The wireless relay device 100 is also capable of performing wireless communication with the mobile communication terminal 200, and is capable of performing communication with the management device 300 via the hotel LAN 15. The mobile communication terminal 200 is a smartphone in this embodiment and is owned by a guest who checks in the room R1. The mobile communication terminal 200 is capable of performing wireless communication with the wireless relay device 100. The management device 300 can perform communication with the wireless relay device 100 in each room via the hotel LAN 15. The hotel LAN 15 is a wired LAN in this embodiment and may be, for example, any of various wired LANs specified in IEEE 802.3 standard group. A PLC (Power Line Communication) may be employed instead of any of the various wireless LANs specified in IEEE 802.3 standard group. A different standard (frequency and modulation method) of wireless communication from the standard used by the wireless relay device 100 for communication with the lighting device 400a and the air conditioner 400b may also be employed.

Figure 2:
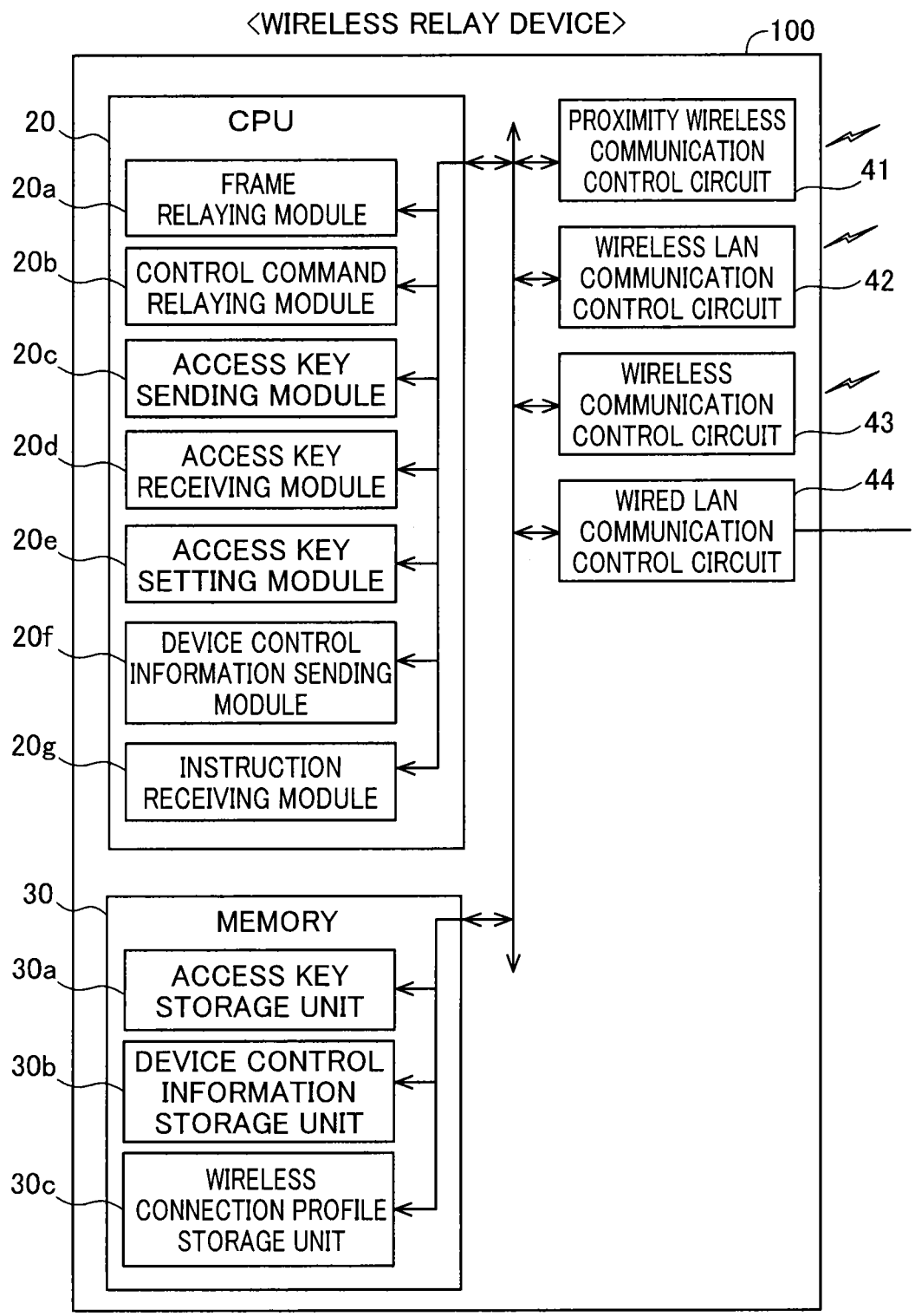
FIG. 2 is a block diagram illustrating the detailed configuration of the wireless relay device 100 shown in FIG. 1.

FIG. 2 is a block diagram illustrating the detailed configuration of the wireless relay device 100 shown in FIG. 1. The wireless relay device 100 includes a proximity wireless communication control circuit 41, a wireless LAN communication control circuit 42, a wireless communication control circuit 43, a wired LAN communication control circuit 44, a CPU (Central Processing Unit) 20 and a memory 30.

The proximity wireless communication control circuit 41 includes a modulator, an amplifier and an antenna and performs wireless communication in the coverage of not greater than several tens meters. According to this embodiment, NFC (Near Field Communication) specified in ISO/IEC 18092 is employed for such wireless communication. Any wireless communication having a relatively short maximum coverage, such as RFID (Radio Frequency Identification) specified in, for example, ISO/IEC 21481, ISO/IEC 14433 (MIFARE (registered trademark), TransferJet (registered trademark), Felica (registered trademark) or ISO/IEC 15693 may be employed, instead of ISO/IEC 18092.

The wireless LAN communication control circuit 42 includes a modulator, an amplifier and an antenna and serves as a wireless LAN access point in conformity with, for example, IEEE 802.11a/b/g/n/ac to perform wireless communication with a wireless LAN station.

The wireless communication control circuit 43 has similar functions to those of the wireless communication unit 410a of the lighting deice 400a and the wireless communication unit 410b of the air conditioner 400b described above and is thus not described in detail herein.

The wired LAN communication control circuit 44 has a port to which a network cable is connected and work to send and receive frames in conformity with IEEE (The Institute of Electrical and Electronics Engineers) 802.3 The wireless relay device 100 is connected to the hotel LAN 15 by the wired LAN communication control circuit 44.

The CPU 20 performs a control program stored in the memory 30 to serve as a frame relaying module 20a, a control command relaying module 20b, an access key sending module 20c, an access key receiving module 20d, an access key setting module 20e, a device control information sending module 20f and an instruction receiving module 20g.

The frame relaying module 20a relays frames received via the respective communication control circuits 41 to 44 described above (layer 2 frames in an OSI (Open Systems Interconnection) reference model). For example, when the wireless communication control circuit 43 performs, as the wireless communication, wireless communication of a different system (protocol) from the wireless LAN (wireless LAN specified in IEEE 802.11 standard group) such as Z-Wave (registered trademark) or Zigbee (registered trademark), the frame relaying module 20a performs protocol conversion between the wireless communication control circuit 43 and the wireless LAN communication control circuit 42, and the wireless relay device 100 serves as a gateway. In another example, when the wireless communication control circuit 43 performs wireless LAN communication as the wireless communication, the frame relaying module 20a relays layer 2 frames between the wireless communication control circuit 43 and the wireless LAN communication control circuit 42, and the wireless relay device 100 serves as a bridge. The control command relaying module 20b controls relay of control commands for controlling the lighting device 400a and the air conditioner 400b. The access key sending module 20c sends an access key used for controlling the lighting device 400a and the air conditioner 400b to the mobile communication terminal 200 via the proximity wireless communication control circuit 41. The access key will be described in detail later. The access key receiving module 20*d* receives an access key via the wireless LAN communication control circuit 42 and determines the validity of the received access key. The access key setting module 20*e* changes an access key stored in an access key storage unit 30*a* described below. The device control information sending module 20*f* sends device control information stored in a device control information storage unit 30*b* described below to the mobile communication terminal 200. The instruction receiving module 20*g* receives an instruction output from the management device 300.

The memory 30 includes an access key storage unit 30*a*, a device control information storage unit 30*b* and a wireless connection profile storage unit 30*c*. The access key storage unit 30*a* stores an access key. An access key has been stored in advance in the access key storage unit 30*a* and is changed when the guest checks out. The device control information storage unit 30*b* stores device control information of the lighting device 400*a* and the air conditioner 400*b*. The device control information is information used for controlling the lighting device 400*a* and the air conditioner 400*b*.

The access key handled by the CPU 20 and the memory 30 as described above is information which may be output with a control command from the mobile communication terminal 200 and is information used to determine whether relay of the control command is allowed or not allowed to the lighting device 400*a* or the air conditioner 400*b*. As described later, as long as the access key received from the mobile communication terminal 200 via the wireless LAN communication control circuit 42 is valid, the wireless relay device 100 relays the control command to the lighting device 400*a* or the air conditioner 400*b* via the wireless communication control circuit 43. According to this embodiment, information consisting of a predetermined number of digits and letters is used as the access key. The number of digits of the access key may be fixed or may be a variable number of digits.

FIG. 3 is a diagram schematically showing a configuration example of the device control information of the lighting device 400*a* and the air conditioner 400*b*. In FIG. 3, No. 1 shows the device control information of the lighting device 400*a*, and No. 2 shows the device control information of the air conditioner 400*b*. As shown in FIG. 3, the device control information includes a device type, a model number, a control item, a setting range and a control command. The device type is information showing the type of an object device to be controlled; "lighting device" is set for the lighting device 400*a* and "air conditioner" is set for the air conditioner 400*b*. The model number is information showing the model number of the object device to be controlled; "AAAAA" is set for the lighting device 400*a* and "BBBBB" is set for the air conditioner 400*b*. The control item is information showing an item controllable in the object device to be controlled; "operation" is set for the lighting device 400*a* and "operation", "drive mode" and "target temperature" are set for the air conditioner 400*b*. The setting range is information showing a settable value or a settable value range with respect to the controllable item. As shown in FIG. 3, with respect to the control item "operation" of the lighting device 400*a*, "ON" and "OFF" are set. This means that ON or OFF may be set as the operation of the lighting device 400*a*. With respect to the control item "operation" of the air conditioner 400*b*, "ON" and "OFF" are set. With respect to the control item "drive mode" of the air conditioner 400*b*, "cooling", "heating" and "dehumidification" are set. This means that a cooling mode, a heating mode and a dehumidification mode may be selectively set as the drive mode of the air conditioner 400*b*. With respect to the control item "target temperature" of the air conditioner 400*b*, "15° C. to 30° C." is set. This means that any temperature in the range of 15° C. to 30° C. may be set as the target temperature of the air conditioner 400*b*. The control command is information showing a command for controlling the control item in each of the object devices to be controlled (lighting device 400*a* and air conditioner 400*b*). The control command may specify a setting range. As shown in FIG. 3, a control command "aaaa" is set for the control item "operation" of the lighting deice 400*a*. A control command "bbbb" is set for the control item "operation" of the air conditioner 400*b*. A control command "cccc" is set for the control item "drive mode" of the air conditioner 400*b*, and a control command "dddd" is set for the control item "target temperature" of the air conditioner 400*b*. The device control information of the lighting device 400*a* and the air conditioner 400*b* described above have been stored in advance in the device control information storage unit 30*b* by a system administrator.

Various pieces of information (wireless connection profile) used for wireless communication by the wireless LAN communication control circuit 42 or the wireless communication control circuit 43 have been stored in advance in the wireless connection profile storage unit 30*c* shown in FIG. 2. More specifically, an ESSID (Extended Service Set Identifier), information indicating an encryption system and information such as an encryption key have been stored in advance in the wireless connection profile storage unit 30*c*.

Figure 4:
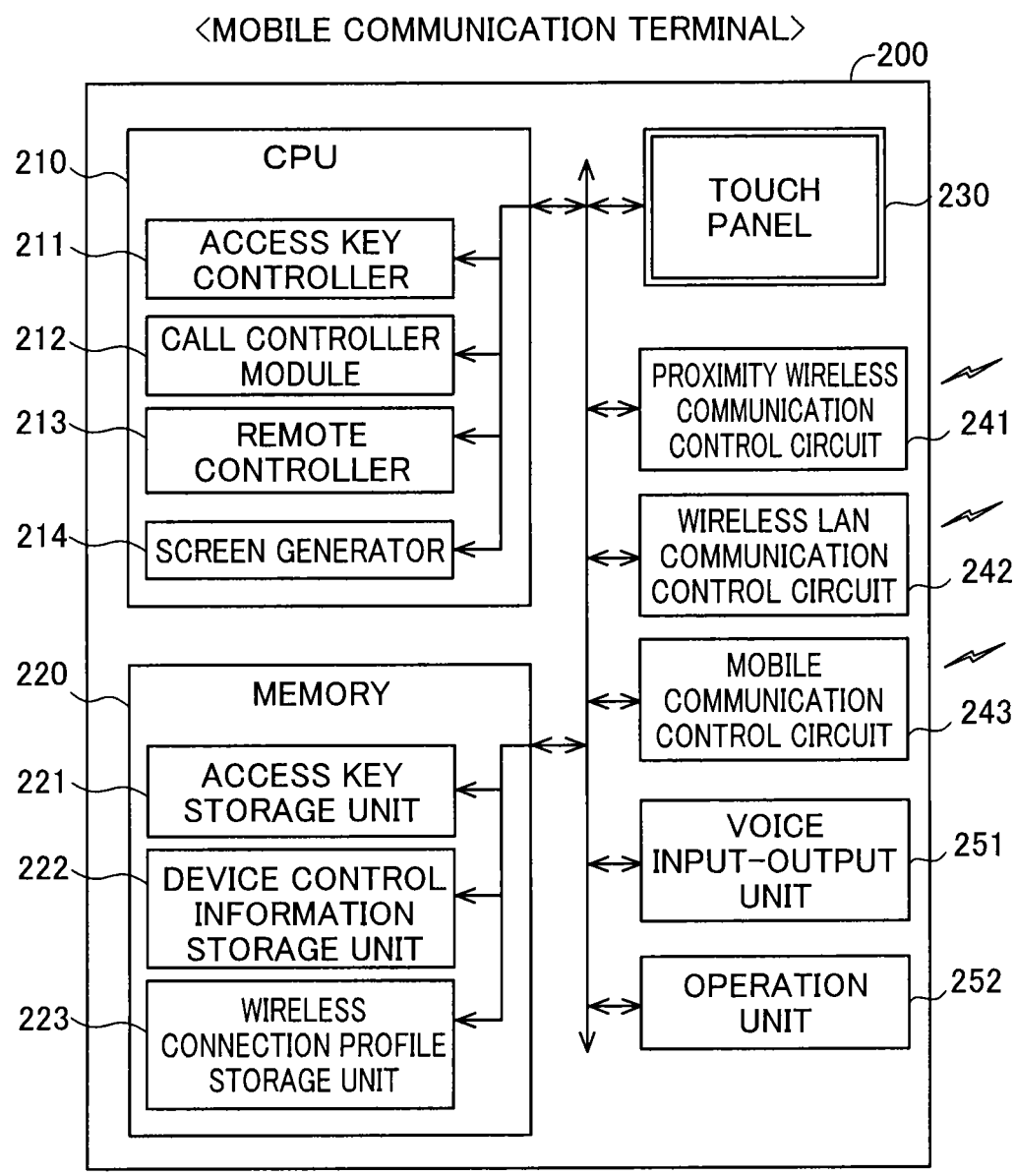
FIG. 4 is a block diagram illustrating the detailed configuration of the mobile communication terminal 200 shown in FIG. 1.

FIG. 4 is a block diagram illustrating the detailed configuration of the mobile communication terminal 200 shown in FIG. 1. As shown in FIG. 4, the mobile communication terminal 200 includes a touch panel 230, a proximity wireless communication control circuit 241, a wireless LAN communication control circuit 242, a mobile communication control circuit 243, a voice input-output unit 251, an operation unit 252, a CPU 210 and a memory 220.

A touch panel of any operation system, such as a resistance film system or a capacitance system, may be employed for the touch panel 230. The proximity wireless communication control circuit 241 has a similar configuration to that of the proximity wireless communication control circuit 41 of the wireless relay device 100 shown in FIG. 2 and is thus not described in detail herein. Similarly the wireless LAN communication control circuit 242 has a similar configuration to that of the wireless LAN communication control circuit 42 of the wireless relay device 100 shown in FIG. 2 and is thus not described in detail herein. The mobile communication control circuit 243 includes a modulator, an amplifier and an antenna and serves as a mobile communication terminal performing wireless data communication in conformity with a standard such as 3G/HSPA (High Speed Packet Access), LTE (Long Term Evolution) or Wimax (Worldwide Interoperability for Microwave Access) to perform wireless communication with a base station of a mobile communication network. The voice input-output unit 251 includes a microphone and a speaker and serves to input and output voices. The operation unit 252 includes operation buttons for selecting various menus, operation buttons for adjusting the volume and buttons for entering numbers and letter strings.

The CPU 210 performs a control program stored in the memory 220 to serve as an access key controller 211 and a call controller 212. The access key controller 211 receives an access key and a wireless connection profile from the wireless relay device 100 via the proximity wireless communication control circuit 241. The call controller 212 performs call control in a voice call via the mobile communication control circuit 243. The CPU 210 serves as the access key controller 211 and the call controller 212 described above when the mobile communication terminal 200 is powered on. The CPU 210 also serves as a remote controller 213 and a screen generator 214 when a remote control application is performed in a remote control process described later after the mobile communication terminal 200 is powered on. The remote controller 213 performs remote control of the lighting device 400a and the air conditioner 400b. The screen generator 214 generates an operation screen for remote control of the lighting device 400a and the air conditioner 400b and displays the generated operation screen on the touch panel 230.

The memory 220 includes an access key storage unit 221, a device control information storage unit 222 and a wireless connection profile storage unit 223. The access key storage unit 221 stores an access key. The device control information storage unit 222 stores device control information. The wireless connection profile storage unit 223 stores a wireless connection profile. No information has been stored in the respective storage units 221 to 223 of the mobile communication terminal 200 immediately after a check-in. The information is stored in the respective storage units 221 to 223 in the remote control process described later. According to this embodiment, the mobile communication terminal 200 controls, for example, the lighting device 400a, by wireless communication and this is called "remote control". In the actual state, the mobile communication terminal 200 may be used in proximity to the lighting device 400a or the air conditioner 400b or may be placed in a dock provided in the air conditioner 400b or another home appliance (such as TV set or audio equipment) to control the corresponding device or equipment.

Figure 5:
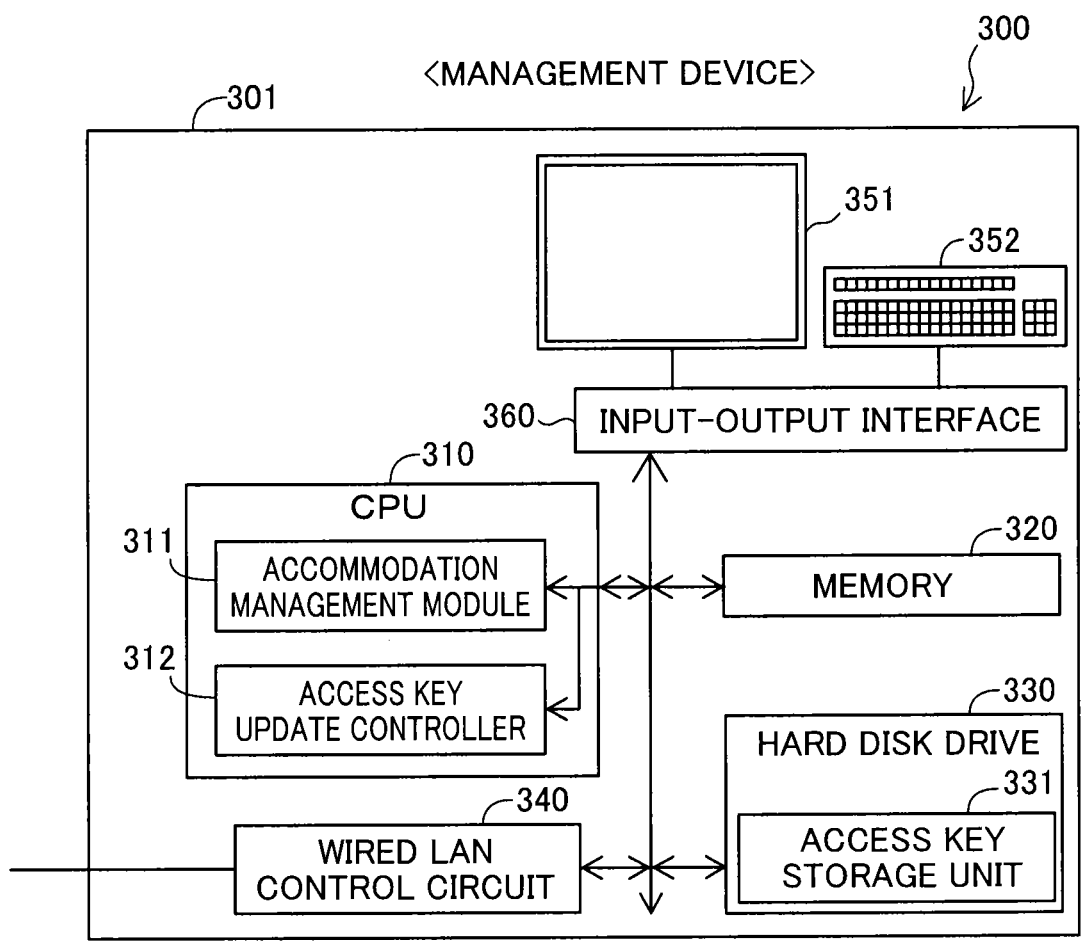
FIG. 5 is a block diagram illustrating the detailed configuration of the management device 300 shown in FIG. 1.

FIG. 5 is a block diagram illustrating the detailed configuration of the management device 300 shown in FIG. 1. The management device 300 is implemented by a laptop personal computer (PC) and includes a CPU 310, a memory 320, a hard disk drive 330, a wired LAN control circuit 340, a display 351, a keyboard 352 and an input-output interface 360 placed in a casing 301.

The CPU 310 reads and executes a control program stored in the memory 320 to serve as an accommodation management module 311 and an access key update controller 312. The accommodation management module 311 manages check-ins and check-outs of the respective rooms and also manages settlement of accounts in each room. The access key update controller 312 performs an access key change process described later.

The hard disk drive 330 includes an access key storage unit 331. An access key allocated to each room is stored in the access key storage unit 331. The wired LAN control circuit 340 has a similar configuration to that of the wired LAN communication control circuit 44 of the wireless relay device 100 shown in FIG. 2 and is thus not described in detail herein. The display 351 may be, for example, a liquid crystal panel. The input-output interface 360 controls input and output of data between the display 351 or the keyboard 352 and the CPU 310 or the memory 320.

The proximity wireless communication control circuit 41 of the wireless relay device 100 described above corresponds to the subordinate concept of the first communication interface in the claims. The wireless LAN communication control circuit 42 corresponds to the subordinate concept of the second communication interface in the claims; the wireless communication control circuit 43 corresponds to the subordinate concept of the third communication interface in the claims; and the wired LAN communication control circuit 44 corresponds to the subordinate concept of the fourth communication interface in the claims.

A-2. Remote Control Process

When a guest checks in the room R1 shown in FIG. 1 and places the own mobile communication terminal 200 in proximity to the wireless relay device 100, the proximity wireless communication control circuit 241 of the mobile communication terminal 200 and the proximity wireless communication control circuit 41 of the wireless relay deice 100 perform proximity communication, so as to establish a communication path by NFC between the mobile communication terminal 200 and the wireless relay device 100. On establishment of the communication path, a process for remote control of the lighting device 400a and the air conditioner 400b by the mobile communication terminal 200 (hereinafter referred to as "remote control process") starts.

Figure 6:
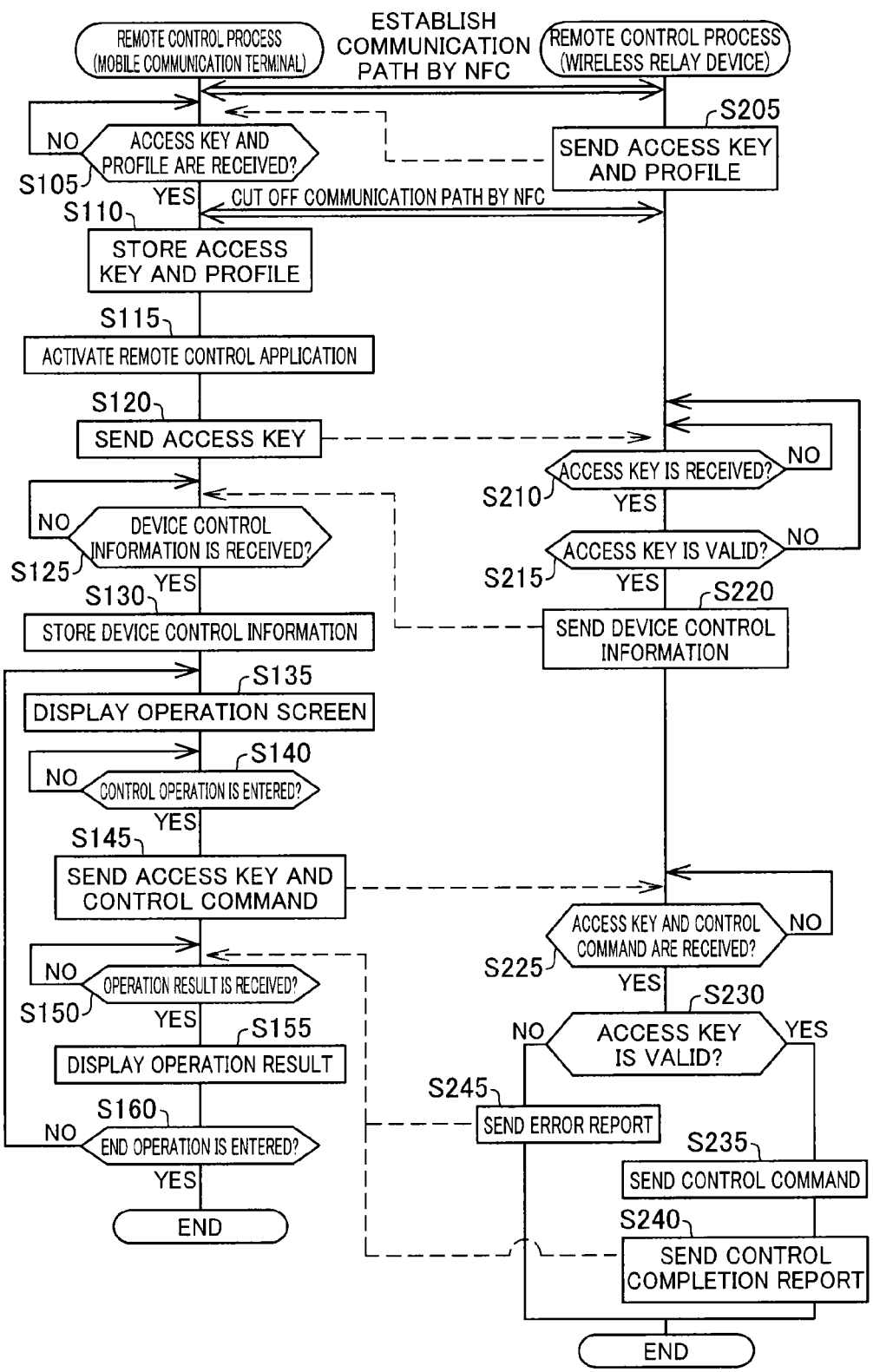
FIG. 6 is a sequence diagram showing a procedure of the remote control process according to the first embodiment.

FIG. 6 is a sequence diagram showing a procedure of the remote control process according to the first embodiment. In FIG. 6, the left side shows a processing flow performed by the mobile communication terminal 200, and the right side shows a processing flow performed by the wireless relay device 100. On establishment of a communication path by NFC with the mobile communication terminal 200, the access key sending module 20c of the wireless relay device 100 sends an access key for the room R1 and a wireless connection profile used for wireless LAN connection with the wireless relay device 100 to the mobile communication terminal 200 by using NFC (step S205).

On the start of the remote control process, the access key controller 211 of the mobile communication terminal 200 waits until an access key and a wireless connection profile are received (step S105). When receiving an access key and a wireless connection profile (step S105: YES), the access key controller 211 stores the received access key into the access key storage unit 221 and stores the received wireless connection profile into the wireless connection profile storage unit 223 (step S110). When sending and receiving the access key and the wireless connection profile has been completed and the mobile communication terminal 200 is placed away from the wireless relay device 100, the communication path by NFC is cut off.

In the mobile communication terminal 200, after storing the access key and the wireless connection profile (step S110), the CPU 20 activates a remote control application (step S115). When the remote control application is activated, the CPU 20 serves as the remote controller 213 and the screen generator 214 shown in FIG. 4. The remote controller 213 sends the access key received from the wireless relay device 100 to the wireless relay device 100 via the wireless LAN communication control circuit 242 (step S120).

After establishing the communication path by NFC with the mobile communication terminal 200 and performing step S205 as described above, the wireless relay device 100 waits until the access key receiving module 20d receives an access key via the wireless LAN communication control circuit 42 (step S210). When receiving an access key (step S210: YES), the wireless relay device 100 determines whether the received access key is valid (step S215). More specifically, the procedure of such determination determines whether the received access key matches with an access key stored in the access key storage unit 30a of the wireless relay device 100. The access key is determined as valid in the case of matching of the two keys, while being determined as invalid in the case of mismatching. The determination of whether the access key is valid is performed by the wireless relay device 100 in this embodiment but may be performed by another device, for example, the management device 300. In the latter case, the wireless relay device 100 may send the access key received from the mobile communication terminal 200 to the management device 300, and the management device 300 may determine whether the access key is valid and send back the result of determination to the wireless relay device 100.

When it is determined at above step 5215 that the received access key is invalid (step S215: NO), the processing flow returns to above step S210 to receive an access key again. When it is determined that the received access key is valid (step S215: YES), the wireless relay device 100 or specifically its device control information sending module 20f sends device control information (step S220). The device control information to be sent is device control information of the lighting device 400a and the device control information of the air conditioner 400b (FIG. 3) and is stored in the device control information storage unit 30b. The wireless relay device 100 sends the device control information to the mobile communication terminal 200 via the wireless LAN communication control circuit 42.

After the remote controller 213 performs above step S120, the mobile communication terminal 200 waits until device control information is received (step S125). When receiving device control information (step S125: YES), the mobile communication terminal 200 stores the received device control information into the device control information storage unit 222 (step S130).

The mobile communication terminal 200 or specifically its screen generator 214 generates and displays an operation screen on the touch panel 230 (step S135). More specifically, the screen generator 214 generates an operation screen for the lighting device 400a and the air conditioner 400b based on the device control information stored in the device control information storage unit 222 at step S130 and displays the generated operation screen on the touch panel 230.

Figure 7:
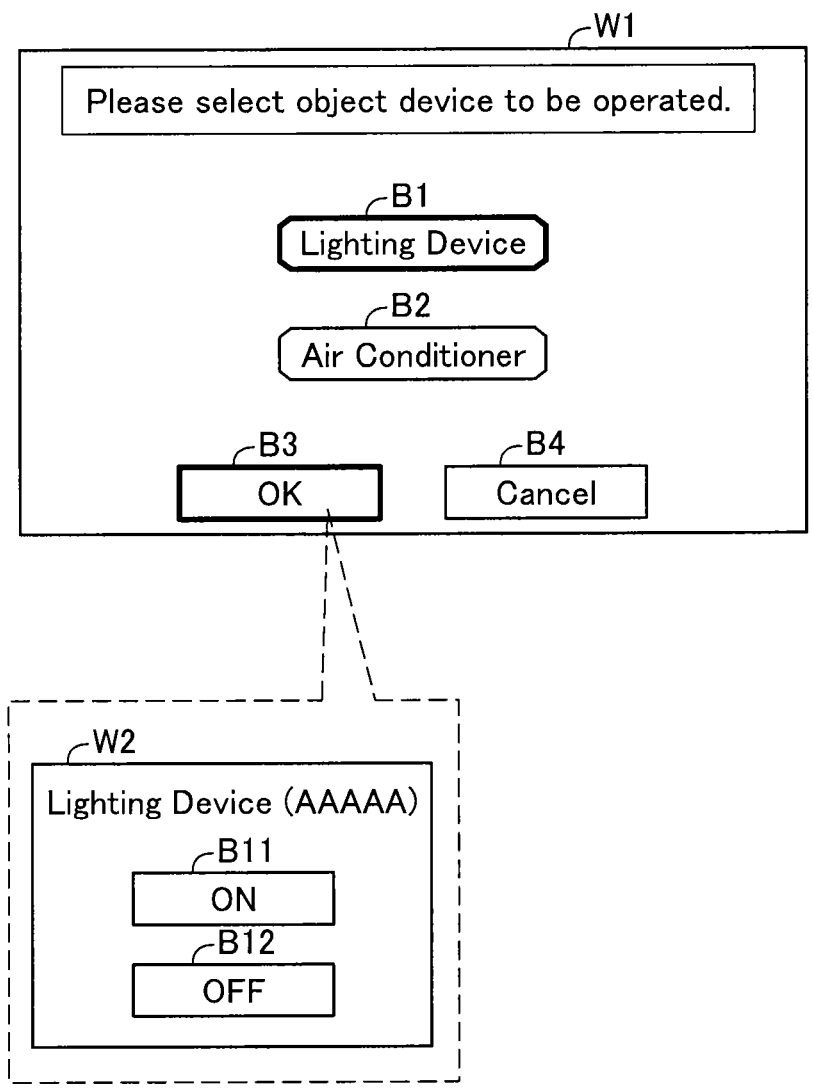
FIG. 7 is a diagram illustrating one example of the operation screen generated at step S135.

FIG. 7 is a diagram illustrating one example of the operation screen generated at step S135. An operation screen W1 displays a letter string "Please select object device to be operated", two object device selection buttons B1 and B2, an OK button B3 and a Cancel button B4. The object device selection button B1 is a button operated to select the lighting device 400a, and the object device selection button B2 is a button operated to select the air conditioner 400b. In the illustrated example of FIG. 7, the object device selection button B1 with display of a letter string "lighting device" is selected. In response to a press of the OK button B3 in this state, a control screen W2 for the lighting device 400a is displayed on the touch panel 230. The control screen W2 displays the device type (lighting device) and the model number (AAAAA) of the lighting device 400a as the object device to be controlled. The control screen W2 also displays two buttons B11 and B12 for selecting "ON" and "OFF" which are the setting range of the control item "operation" of the lighting device shown in FIG. 3.

Referring back to FIG. 6, in the mobile communication terminal 200, after the screen generator 214 generates and displays the screen (step S135), the remote controller 213 waits until a control operation is entered on the operation screen (step S140). When recognizing entry of a control operation (step S140: YES), the remote controller 213 sends a control command corresponding to the entered control operation and the access key stored in the access key storage unit 221 to the wireless relay device 100 via the wireless LAN communication control circuit 242 (step S145). For example, in the control screen W2 shown in FIG. 7, when a guest presses the button B11 with display of a letter string "ON", the remote controller 213 sends a control command for powering on the lighting device 400a and the access key to the wireless relay device 100. On completion of the operation using the control screen W2, the display on the touch panel 230 is returned to the operation screen W1.

After performing above step S220, the wireless relay device 100 waits until the control command relaying module 20b receives an access key and a control command (step S225). When receiving an access key and a control command (step S225: YES), the wireless relay device 100 determines whether the received access key is valid (step S230). The processing detail of step S230 is identical with that of above step S215 and is thus not described herein.

When it is determined at above step S230 that the received access key is valid (step S230: YES), the control command relaying module 20b sends only the control command of the received access key and control command to the lighting device 400a or the air conditioner 400b via the wireless communication control circuit 43 (step S235). The control command relaying module 20b subsequently sends a control completion report to the mobile communication terminal 200 via the wireless LAN communication control circuit 42 (step S240). When it is determined at above step S230 that the received access key is invalid (step S230: NO), on the other hand, the control command relaying module 20b sends an error report to the mobile communication terminal 200 via the wireless LAN communication control circuit 42 (step S245). After performing above step S240 or step S245, the wireless relay device 100 terminates the processing flow of the remote control process.

After the remote controller 213 performs above step S145, the mobile communication terminal 200 waits until an operation result is received (step S150). When receiving an operation result (control completion report or error report) sent from the wireless relay device 100 (step S150: YES), the remote controller 213 displays information representing the received operation result on the touch panel 230 (step S155). The information displayed at step S155 may be, for example, a letter string "operation completed" displayed on the operation screen W1 in the case of receiving the control completion report and a letter string "error" displayed on the operation screen W1 in the case of receiving the error report. Alternatively a symbol like "circle" or "cross mark" or an illustration representing the operating condition of the device may be displayed.

In the mobile communication terminal 200, the remote controller 213 determines whether the guest has entered an end operation of the remote control application (step S160). When it is determined that the end operation is entered (step S160: YES), the mobile communication terminal 200 terminates the processing flow of the remote control process. According to this embodiment, entering the end operation means pressing the Cancel button B4 shown in FIG. 7. When it is determined at step S160 that the end operation is not entered (step S160: NO), on the other hand, the processing flow returns to above step S135.

According to the first embodiment, a plurality of guests (for example, a couple or a parent and a child) simultaneously stay in the same room R1, the mobile communication terminals 200 of the respective guests can be used as remote controls of the lighting device 400a and the air conditioner 400b. When the respective guests place their own mobile communication terminals 200 in proximity to the wireless relay device 100, the same access key and device control information are sent to the respective mobile communication terminals 200. The mobile communication terminals 200 of the respective guests perform the remote control process shown in FIG. 6 using the same access key and device control information, so as to control, for example, the lighting device 400a.

A-3. Access Key Change Process

In response to respective power-on operations, the management device 300 and the wireless relay device 100 start an access key change process. The access key change process is a process of changing the access key stored in the access key storage unit 30a of the wireless relay device 100.

Figures 8, 9:
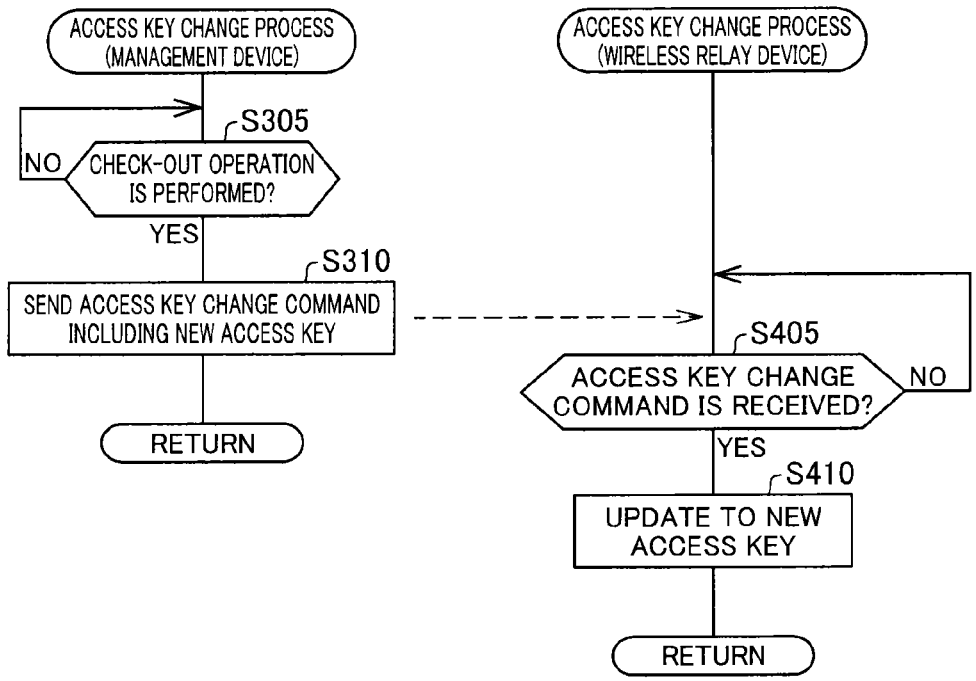
FIG. 8 is a sequence diagram showing a procedure of the access key change process according to the first embodiment.
FIG. 9 is a diagram schematically illustrating one example of device control information according to a second embodiment.

FIG. 8 is a sequence diagram showing a procedure of the access key change process according to the first embodiment. In FIG. 8, the left side shows a processing flow performed by the management device 300, and the right side shows a processing flow performed by the wireless relay device 100.

The management device 300 or specifically its access key update controller 312 waits until the accommodation management module 311 performs a check-out operation (step S305). When the accommodation management module 311 performs and completes a check-out operation (step S305: YES), the access key update controller 312 changes the access key allocated to the checked-out room to a new access key and stores the new access key after the change into the access key storage unit 331. The access key update controller 312 subsequently sends an access key change command including the new access key after the change to the wireless relay device 100 in the checked-out room via the wired LAN control circuit 340 (step S310). Storing the new access key may be omitted.

The wireless relay device 100 or specifically its access key setting module 20e monitors receiving the access key change command via the wired LAN communication control circuit 44 (step S405). When receiving the access key change command (step S405: YES), the access key setting module 20e updates the access key stored in the access key storage unit 30a to the new access key included in the received access key change command (step S410).

In the control system 10 of the first embodiment described above, when the wireless relay device 100 determines that the access key received from the mobile communication terminal 200 is invalid, the control command received from the mobile communication terminal 200 is not sent (relayed) to the lighting device 400a or the air conditioner 400b. Accordingly, approval or denial for controlling the lighting device 400a and the air conditioner 400b is controllable by using the access key. In the control system 10, when the guest checks out and accommodation management module 311 performs the check-out operation, the access key stored in the access key storage unit 30a of the wireless relay device 100 is updated. This prevents the guest from being continuously allowed to control the lighting device 400a and the air conditioner 400b after the check-out. The mobile communication terminal 200 of the user can thus be used as the remote control of the lighting device 400a and the air conditioner 400b in a limited available time period. Termination of the available time period may be controlled by the management device 300.

Additionally, the mobile communication terminal 200 can be used as the remote control of the lighting device 400a and the air conditioner 400b by simply placing the mobile communication terminal 200 in proximity to the wireless relay device 100. The guest can thus readily use the mobile communication terminal 200 as the remote control. By placing the mobile communication terminal 200 in proximity to the wireless relay device 100, the device control information required for controlling the object device to be controlled (lighting device 400a and air conditioner 400b) can be transferred to the mobile communication terminal 200. The device control information can thus be sent to only the mobile communication terminal 200, which is placed in proximity to the wireless relay device 100 by the user and is intended for the user to be used as the remote control. In other words, this suppresses the device control information from being sent to any mobile communication terminal which is not intended for the user to be used as the remote control.

B. Second Embodiment

Figure 10:
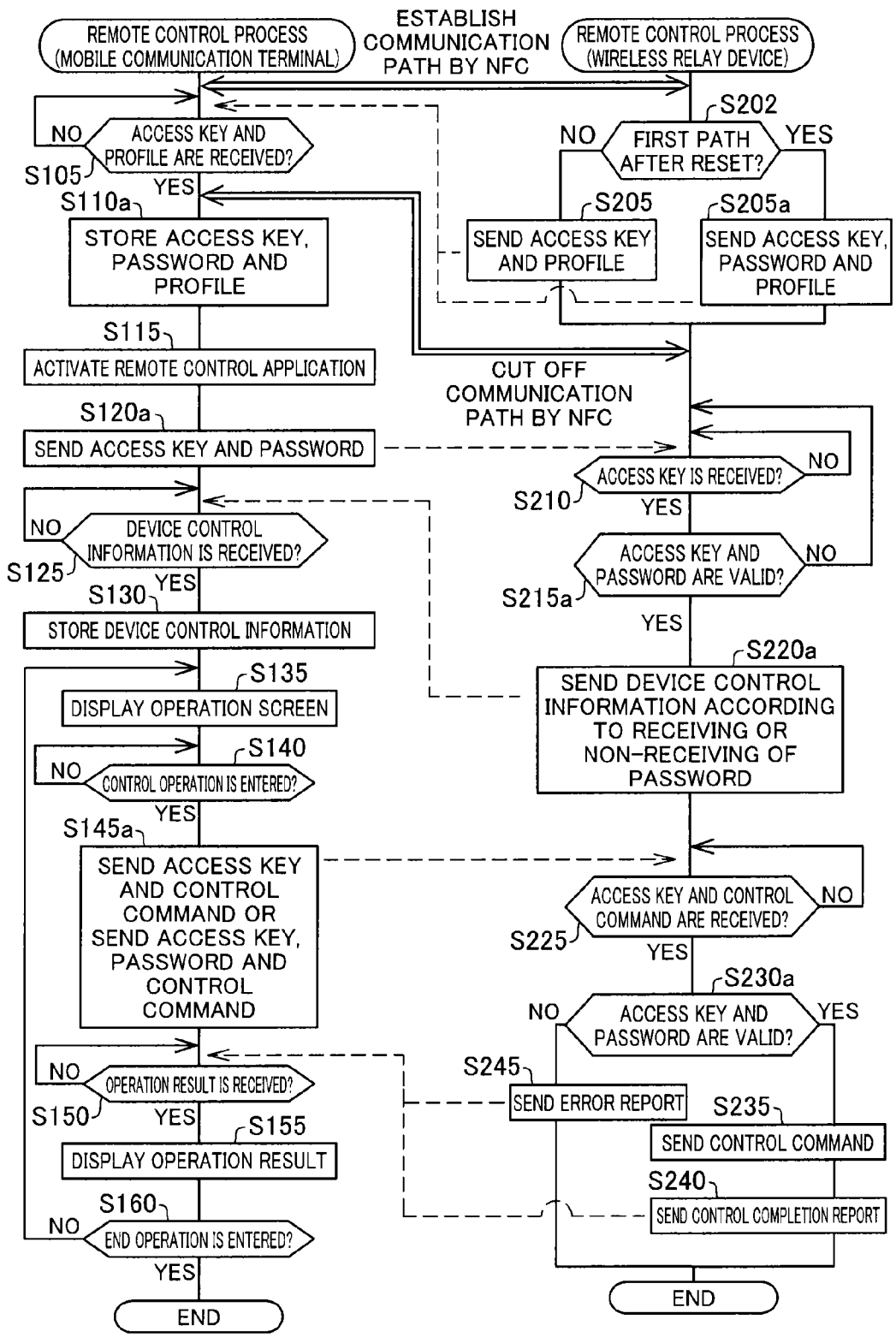
FIG. 10 is a sequence diagram showing a procedure of remote control process according to the second embodiment.

FIG. 9 is a diagram schematically illustrating one example of device control information according to a second embodiment. FIG. 10 is a sequence diagram showing a procedure of remote control process according to the second embodiment. A control system of the second embodiment differs from the control system 10 of the first embodiment by the details of the device control information to be managed, setting (storing) a password with an access key in the management device 300 and the wireless relay device 100, and the concrete procedure of the remote control process. The other configuration and the procedure of the access key change process in the control system of the second embodiment are similar to those of the first embodiment, so that the same components and the same steps are expressed by the same numerical symbols and the same step numbers as those of the first embodiment and are not specifically described herein. Although not being specifically illustrated, a TV set is placed together with the lighting device 400a and the air conditioner 400b in the room R1 of the second embodiment, and the TV set is controllable by the mobile communication terminal 200.

In the control system 10 of the first embodiment, when a plurality of guests simultaneously stay in the same room R1, the object device to be controlled by their mobile communication terminals 200 is the same for all the guests. In the control system of the second embodiment, on the other hand, different guests have different object devices to be controlled by their mobile communication terminals 200.

As shown in FIG. 9, the device control information of the second embodiment includes the setting of device control information of the TV set as No. 3. More specifically, "TV set" is set as the device type; "CCCCC" is set as the model number; "operation, channel and volume" are set as the control items. With respect to the control item "operation", "ON" and "OFF" are set as the setting range; with respect to the control item "channel", "1 to 15" is set as the setting range; and with respect to the control item "volume", "1 to 30" is set as the setting range. A control command "eeee" is set with respect to the control item "operation" of the TV set; a control command "ffff" is set with respect to the control item "channel" of the TV set; and a control command "gggg" is set with respect to the control item "volume" of the TV set. Additionally, as shown in FIG. 9, the device control information of the second embodiment includes information "control terminal". The "control terminal" is information for specifying the mobile communication terminal which is allowed to control each device. As shown in FIG. 9, "ALL (all terminals) are set as the control terminal with respect to No. 1 (lighting device 400a) and No. 2 (air conditioner 400b). Setting "ALL (all terminals)" to the control terminal means that any mobile communication terminal may be allowed to control the lighting device 400a and the air conditioner 400b. With respect to No. 3 (TV set), on the other hand, "primary" is set as the control terminal. Setting "primary" to the control terminal means that only a mobile communication terminal recognized as primary is allowed to control the TV set. As described later, the mobile communication terminal 200 is recognized as primary only when it is determined that a password is valid, in addition to the access key as described above.

A password is stored in advance together with an access key for each room in the access key storage unit 331 of the management device 300. Similarly, a password is stored in advance together with an access key in the access key storage unit 30a of the wireless relay device 100. The access key change process shown in FIG. 8 updates only the access key but does not update the password.

The remote control process of the second embodiment shown in FIG. 10 differs from the remote control process of the first embodiment shown in FIG. 6 by performing additional steps S202 and S205a in the wireless relay device 100, performing step S215a in place of step S215 in the wireless relay device 100, performing step S220a in place of step S220 in the wireless relay device 100, performing step S230a in place of step S230 in the wireless relay device 100, performing step S110a in place of step S110 in the mobile communication terminal 200, performing step S120a in place of step S120 in the mobile communication terminal 200 and performing step S145a in place of step S145 in the mobile communication terminal 200. The other steps in the remote control process of the second embodiment are the same as those in the remote control process of the first embodiment, so that the same steps are expressed by the same step numbers as those of the first embodiment and are not specifically described herein.

The wireless relay device 100 or specifically its access key sending module 20c determines whether a communication path by NFC established with the mobile communication terminal 200 is a first communication path established after change (reset) of an access key (step S202). When it is determined at step S202 that the established communication path is the first communication path established after the reset (step S202: YES), the access key sending module 20c sends an access key, a password and a wireless connection profile to the mobile communication terminal 200 by using NFC (step S205a). When it is determined that the established communication path is not the first communication path established after the reset (step S202: NO), on the other hand, the access key sending module 20c performs step S205 described above. More specifically, the access key sending module 20c sends an access key and a wireless connection profile to the mobile communication terminal 200 by using NFC (step S205).

When receiving an access key, a password and a wireless connection profile, the mobile communication terminal 200 or its access key controller 211 stores the access key and the password into the access key storage unit 221 and stores the wireless connection profile into the wireless connection profile storage unit 223 (step S110a). When receiving an access key and a wireless connection profile but not receiving a password, the access key controller 211 stores the access key into the access key storage unit 221 and stores the wireless connection profile into the wireless connection profile storage unit 223 (step S110a).

After the mobile communication terminal 200 performs step S115, the remote controller 213 sends the received access key or the received access key and password to the wireless relay device 100 via the wireless LAN communication control circuit 242 (step S120a). When above step S205 is performed (i.e., when the access key and the wireless connection profile are sent to the mobile communication terminal 200 but the password is not sent to the mobile communication terminal 200), only the received access key is sent at above step S120a. When above step S205a is performed (i.e., when the access key, the wireless connection profile and the password are sent to the mobile communication terminal 200), on the other hand, the received access key and password are sent at above step S120a.

After performing step S210, the wireless relay device 100 determines whether the received access key is valid or the received access key and password are valid (step S215a). As described above, the password is stored together with the access key in the access key storage unit 30a of the wireless relay device 100, so that the access key receiving module 20d determines whether the received password matches with the stored password and thereby determines whether the received password is valid.

When it is determined at above step S215a that the received access key is valid or the receiving access key and password are valid (step S215a: YES), the wireless relay device 100 or specifically its device control information sending module 20f sends device control information according to receiving or non-receiving of the password to the mobile communication terminal 200 (step S220a). As described above, when the established communication path by NFC is the first communication path established after the reset of the access key, the mobile communication terminal 200 receives the access key and the password from the wireless relay device 100. In this case, transmission from the mobile communication terminal 200 (step S120a) includes the password. When the established communication path by NFC is a second or subsequent communication path established after the reset of the access key, on the other hand, the mobile communication terminal 200 receives the access key but does not receive the password from the wireless relay device 100. In this case, transmission from the mobile communication terminal 200 includes the access key but does not include the password. When receiving the password together with the access key, the wireless relay device 100 recognizes the corresponding mobile communication terminal 200 as primary and sends the device control information with setting both "ALL" and "primary" to the "control terminal" to the mobile communication terminal 200 by its device control information sending module 20f. For example, in the illustrated example of FIG. 9, all the device control information of No. 1 (lighting device 400a), No. 2 (air conditioner 400b) and No. 3 (TV set) is sent to the mobile communication terminal 200 recognized as primary. When receiving the access key without the password, on the other hand, the wireless relay device 100 recognizes the corresponding mobile communication terminal 200 as non-primary and sends only the device control information with setting "ALL" to the "control terminal" to the mobile communication terminal 200 by its device control information sending module 20f. For example, in the illustrated example of FIG. 9, only the device control information of No. 1 (lighting device 400a) and No. 2 (air conditioner 400b) is sent to the mobile communication terminal 200 recognized as non-primary.

As described above, the mobile communication terminal 200 recognized as primary and the mobile communication terminal 200 recognized as non-primary receive different pieces of device control information from the wireless relay device 100 and accordingly have different operation screens displayed on the touch panel 230 at step S135.

Figure 11A:
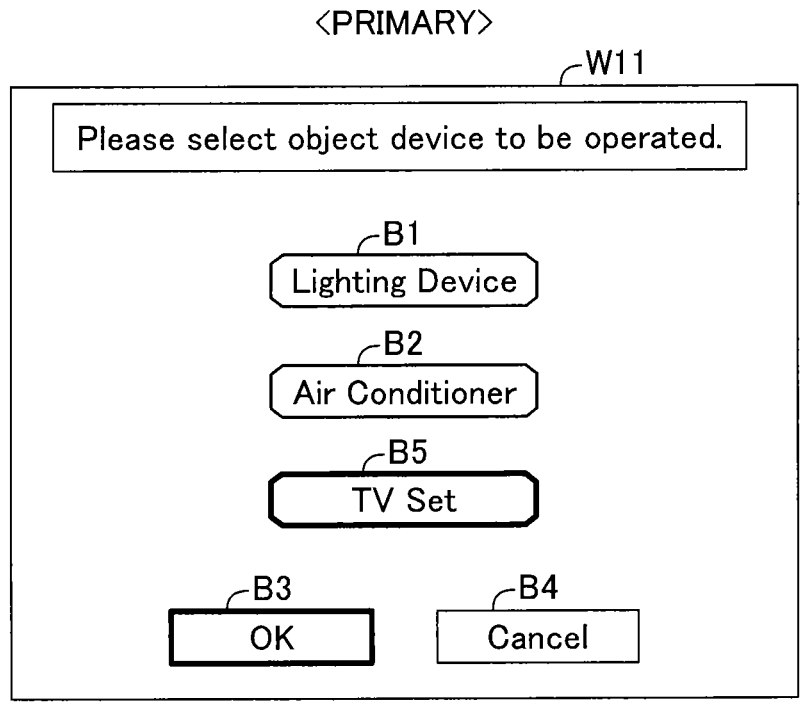
FIG. 11A shows one example of an operation screen W11 displayed on the mobile communication terminal 200 recognized as primary.
Figure 11B:
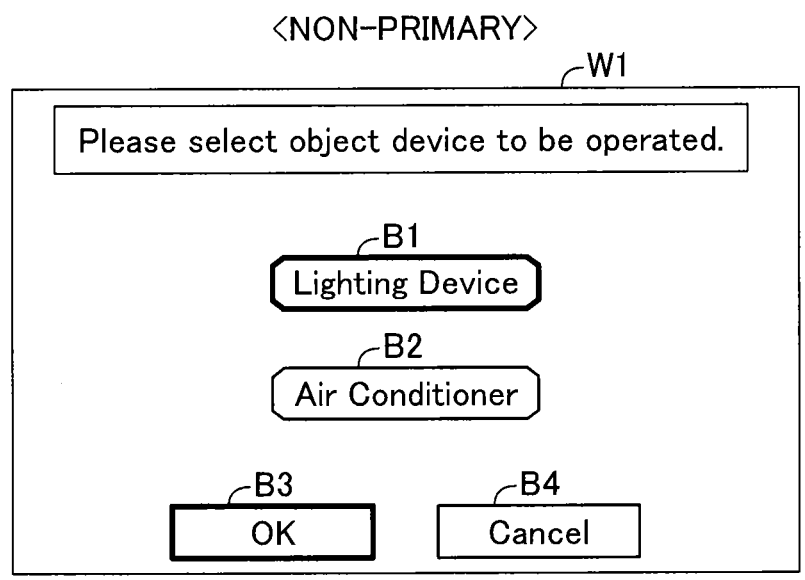
FIG. 11B shows one example of an operation screen W1 displayed on the mobile communication terminal 200 recognized as non-primary.

FIGS. 11A and 11B are diagrams illustrating one example of operation screens according to the second embodiment. FIG. 11A shows one example of an operation screen W11 displayed on the mobile communication terminal 200 recognized as primary. FIG. 11B shows one example of an operation screen W1 displayed on the mobile communication terminal 200 recognized as non-primary. The operation screen W1 shown in FIG. 11B is the same as the operation screen W1 of the first embodiment shown in FIG. 7, so that the same components are expressed by the same symbols as those of the first embodiment and are not specifically described herein.

The operation screen W11 shown in FIG. 11A differs from the operation screen W1 shown in FIG. 11B by additionally providing an object device selection button B5, but otherwise has the same configuration as that of the operation screen W1. Accordingly the same components are expressed by the same symbols as those of the operation screen W1 and are not specifically described herein. The object device selection button B5 is a button operated to select the TV set. When the guest selects the object device selection button B5 and presses the "OK" button, a control screen for the TV set (not shown) is displayed. This control screen displays, for example, buttons for setting the control items "operation", "channel" and "volume" of the TV set shown in FIG. 9.

The control system of the second embodiment described above has the similar advantageous effects to those of the control system 10 of the first embodiment. Additionally, in the control system of the second embodiment, the mobile communication terminal 200 which has established the first communication path by NFC with the wireless relay device 100 after the reset of the access key and the other mobile communication terminals 200 may have different object devices to be controlled. When a plurality of guests simultaneously stay in the same room R1, only the mobile communication terminal 200 of one of the guests may be used as the remote control for the TV set, while the mobile communication terminals 200 of the other guests may have limitations in using as the remote control for the TV set.

C. Third Embodiment

Figure 12:
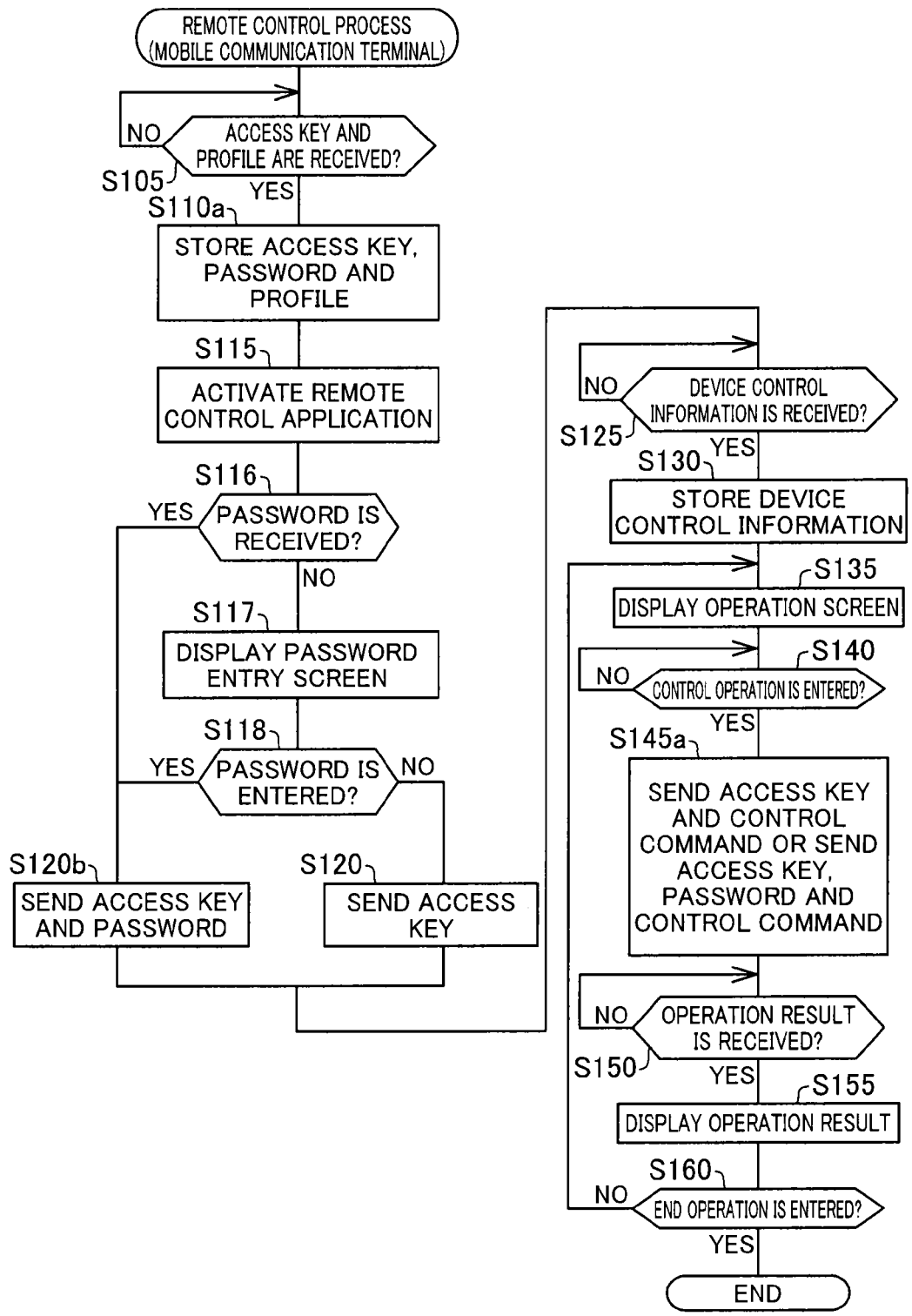
FIG. 12 is a flowchart showing a processing flow of the mobile communication terminal 200 in a remote control process according to a third embodiment.

FIG. 12 is a flowchart showing a processing flow of the mobile communication terminal 200 in a remote control process according to a third embodiment. A control system of the third embodiment differs from the control system of the second embodiment by the processing flow of the mobile communication terminal 200 in the remote control process, but has the system configuration, the processing flow of the wireless relay device 100 in the remote control process and the procedure of the access key change process similar to those of the control system of the second embodiment.

In the control system of the second embodiment, only the mobile communication terminal 200 which has established the first communication path by NFC with the wireless relay device 100 after the reset of the access key is recognized as primary. In the control system of the third embodiment, on the other hand, the mobile communication terminal 200 which has established the second or subsequent communication path by NFC with the wireless relay device 100 after the reset of the access key may be recognized as primary.

As shown in FIG. 12, after the mobile communication terminal 200 performs step S115, its remote controller 213 determines whether a password has been received via the communication path by NFC (step S116). When it is determined at step S116 that no password has been received (step S116: NO), the mobile communication terminal 200 controls its screen generator 214 to generate a password entry screen and display the password entry screen on the touch panel 230 (step S117).

Figure 13:
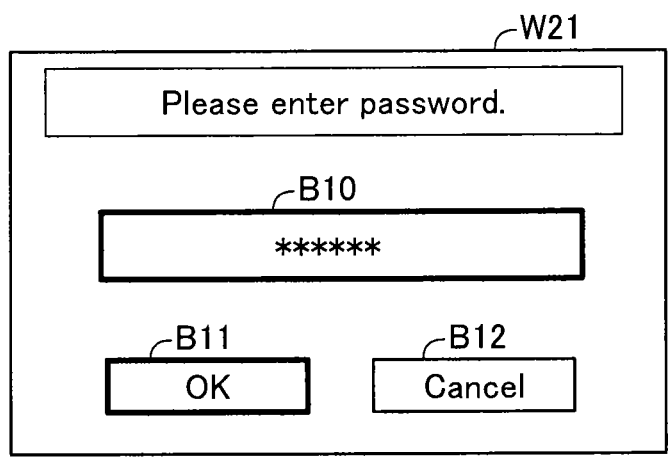
FIG. 13 is a diagram illustrating one example of a password entry screen W21 displayed on the touch panel 230 at step S117 shown in FIG. 12.

FIG. 13 is a diagram illustrating one example of a password entry screen W21 displayed on the touch panel 230 at step S117 shown in FIG. 12. As shown in FIG. 13, the password entry screen W21 displays a letter string "Please enter password", a password entry box B10, an OK button B11 and a Cancel button B12.

As described above in the second embodiment, only the mobile communication terminal 200 which has established the first communication path by NFC with the wireless relay device 100 after the reset of the access key receives a password from the wireless relay device 100. The mobile communication terminal 200 which has established the second or subsequent communication path by NFC with the wireless relay device 100 does not receive a password from the wireless relay device 100. When a guest who owns the mobile communication terminal 200 recognized as primary (hereinafter called "primary guest" for the sake of convenience) is notified of a password at the timing of a check-in or at a different timing from the check-in, however, the primary guest may be allowed to notify another guest who owns a different mobile communication terminal 200 from the mobile communication terminal 200 as primary (hereinafter called "secondary guest" for the sake of convenience) of the password. The secondary guest who is notified of the password by the primary guest can enter the notified password in the password entry screen W21 shown in FIG. 13. The primary guest is also allowed not to notify the secondary guest of the password, and the secondary guest cannot enter the password in the password entry screen W21 in this case.

Referring back to FIG. 12, after performing above step S117, the mobile communication terminal 200 or specifically its remote controller 213 determines whether the password has been entered in the password entry screen W21 (step S118). When it is determined at step S118 that no password has been entered (step S118: NO), the mobile communication terminal 200 performs above step S120. More specifically, the mobile communication terminal 200 or specifically its remote controller 213 sends the access key received from the wireless relay device 100 to the wireless relay device 100 via the wireless LAN communication control circuit 242. When it is determined at step S118 that the password has been entered (step S118: YES), on the other hand, the mobile communication terminal 200 or specifically its remote controller 213 sends the access key and the password to the wireless relay device 100 via the wireless LAN communication control circuit 242 (step S120b). When it is determined at above step S116 that the password has been received (step S116: YES), the processing flow also performs step S120b as described above.

After performing either step S120 or step S120b, the mobile communication terminal 200 performs steps S125 to S160 as described above. The mobile communication terminal 200 having the entry of the password in the password entry screen W21 (mobile communication terminal 200 of the secondary guest) is accordingly recognized as primary by the wireless relay device 100. The operation screen W11 shown in FIG. 11A is then displayed on the mobile communication terminal 200 of the secondary guest and allows the secondary guest to control the TV set.

The control system of the third embodiment described above has the similar advantageous effects to those of the control system of the second embodiment. In the control system of the third embodiment, the password entry screen W21 is displayed on the mobile communication terminal 200 which has established the second or subsequent communication path by NFC with the wireless relay device 100 after the reset of the access key (mobile communication terminal 200 of the secondary guest). When a password is entered in this password entry screen W21, the password is sent together with the access key to the wireless relay device 100. The object device to be controlled by the mobile communication terminal 200 of the secondary guest can thus be equalized with the object device to be controlled by the mobile communication terminal 200 of the primary guest.

D. Fourth Embodiment

Figure 14:
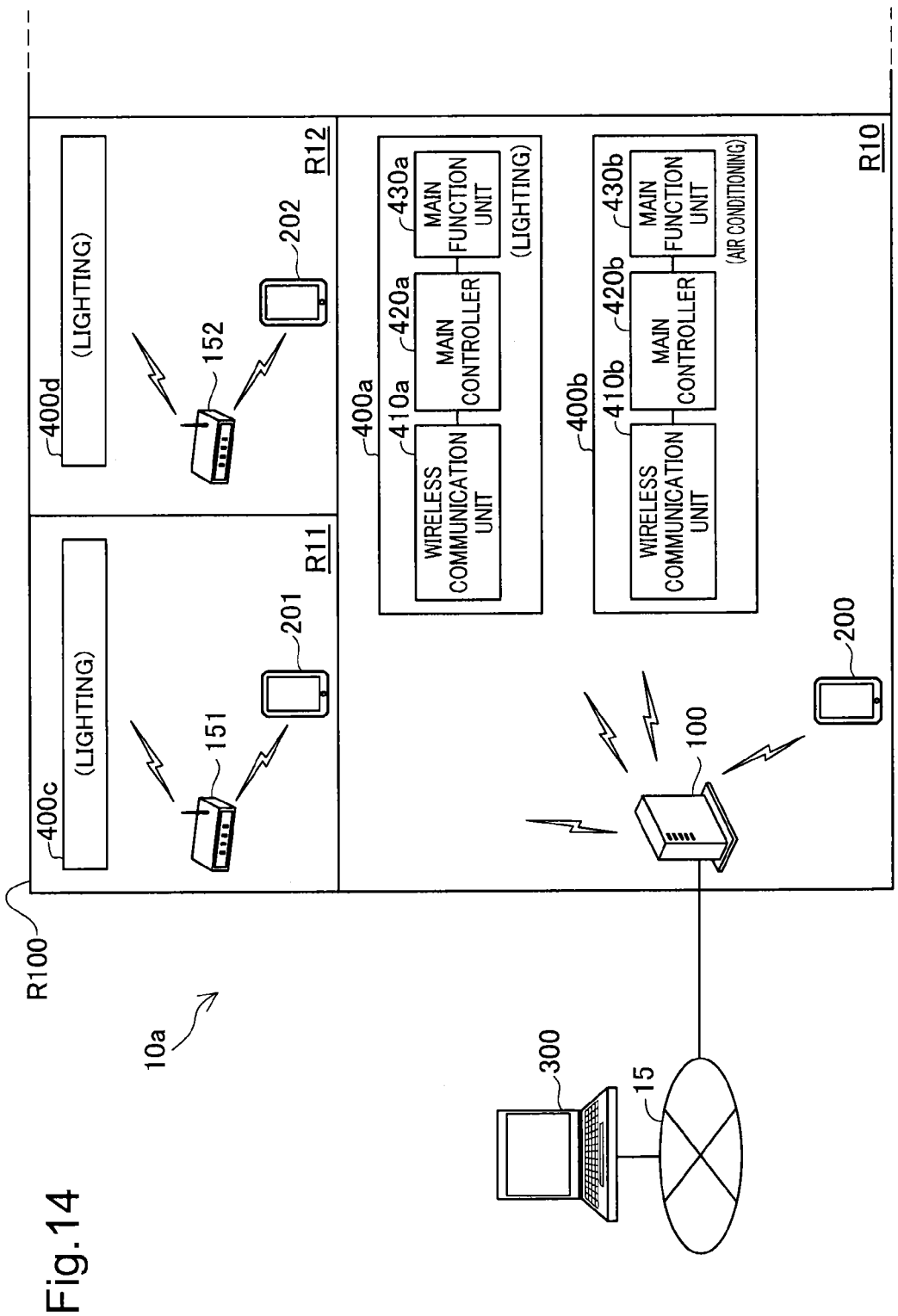
FIG. 14 is a diagram illustrating the general configuration of a control system 10a according to a fourth embodiment.

FIG. 14 is a diagram illustrating the general configuration of a control system 10a according to a fourth embodiment.

The control system 10a differs from the control system 10 of the first embodiment by providing two wireless LAN repeaters 151 and 152 but has the other configuration similar to that of the control system 10 of the first embodiment. The two wireless LAN repeaters 151 and 152 differ from the wireless relay device 100 shown in FIG. 2 by not providing the wired LAN communication control circuit 44 but has the other configuration similar to that of the wireless relay device 100. The two wireless LAN repeaters 151 and 152 and the wireless relay device 100 all have WDS (Wireless Distribution System) function, and wireless communication is performed between the wireless LAN repeater 151 and the wireless relay device 100 and between the wireless LAN repeater 152 and the wireless relay device 100. In the control system 10a, like the wireless relay device 100, the two wireless LAN repeaters 151 and 152 perform a remote control process and an access key change process. In the access key change process of the fourth embodiment, the two wireless LAN repeaters 151 and 152 receive an access key change command from the management device 300 via the hotel LAN 15 and the wireless relay device 100.

In the illustrated example of FIG. 14, one wireless relay device 100 and two wireless LAN repeaters 151 and 152 are placed in a certain hotel room R100. More specifically, the room R100 includes a living room R10, a first bedroom R11 and a second bedroom R12. The wireless relay device 100 is placed in the living room R10, the wireless LAN repeater 151 is placed in the first bedroom R11, and the wireless LAN repeater 152 is placed in the second bedroom R12. A lighting device 400a and an air conditioner 400b which are the same as the lighting device 400a and the air conditioner 400b placed in the room R1 of the first embodiment are placed in the living room R10. A lighting device 400c is placed in the first bedroom R11. A lighting device 400d is placed in the second bedroom R12. Both the two lighting devices 400c and 400d have the same configuration as that of the lighting device 400a in the living room R10 and is not specifically described herein.

In the fourth embodiment, when a plurality of guest check in the room R100, the lighting device 400a and the air conditioner 400b placed in the living room R10 are allowed to be remote controlled by the mobile communication terminals of all the guests, while each of the lighting devices 400c and 400d respectively placed in the two bedrooms R11 and R12 is allowed to be remote controlled by only the mobile communication terminal recognized as primary. More specifically, in the illustrated example of FIG. 14, the lighting device 400a and the air conditioner 400b in the living room R10 are allowed to be controlled by three mobile communication terminals 200, 201 and 202 of three guests who check in the room R100. The lighting device 400c in the first bedroom R11 is, however, allowed to be controlled by only the mobile communication terminal 201 first placed in proximity to the wireless LAN repeater 151 and recognized as primary. Similarly the lighting device 400d in the second bedroom R12 is allowed to be controlled by only the mobile communication terminal 202 first placed in proximity to the wireless LAN repeater 152 and recognized as primary. In other words, the user of the mobile communication terminal 201 places the mobile communication terminal 201 in proximity to the wireless relay device 100 so as to use the mobile communication terminal 201 as the remote control for the object devices to be controlled (lighting device 400a and air conditioner 400b) in the living room R10. The user of the mobile communication terminal 201 also first places the mobile communication terminal 201 in proximity to the wireless LAN repeater 151 so as to use the mobile communication terminal 201 as the remote control for the object device to be controlled (lighting device 400c) in the first bedroom R11. Similarly the user of the mobile communication terminal 202 places the mobile communication terminal 202 in proximity to the wireless relay device 100 so as to use the mobile communication terminal 202 as the remote control for the object devices to be controlled (lighting device 400a and air conditioner 400b) in the living room R10. The user of the mobile communication terminal 202 also first places the mobile communication terminal 202 in proximity to the wireless LAN repeater 152 so as to use the mobile communication terminal 202 as the remote control for the object device to be controlled (lighting device 400d) in the second bedroom R12. All the three mobile communication terminals 200, 201 and 202 have the similar configuration to that of the mobile communication terminal 200 of the first embodiment and activate a similar remote control application and are thus not specifically described herein.

Figure 15:
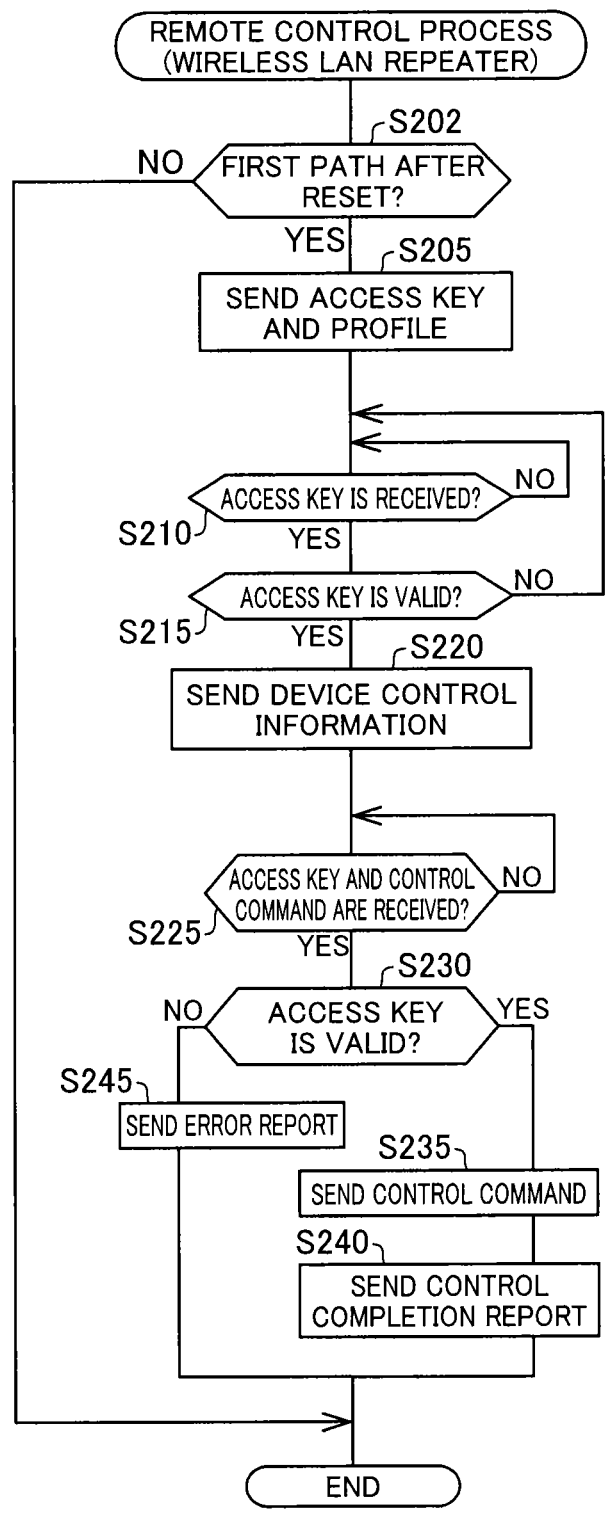
FIG. 15 is a flowchart showing a processing flow of the two wireless LAN repeaters 151 and 152 in a remote control process of the fourth embodiment.

FIG. 15 is a flowchart showing a processing flow of the two wireless LAN repeaters 151 and 152 in a remote control process of the fourth embodiment. The processing flows of the remote control process performed by the wireless relay device 100 and by the mobile communication terminal 200 are similar to those of the first embodiment shown in FIG. 6 and is thus not specifically described herein. The processing flows of the two mobile communication terminals 201 and 202 in the remote control process are similar to the processing flow of the mobile communication terminal 200 in the first embodiment shown in FIG. 6 and are thus not specifically described herein.

The processing flows of the two wireless LAN repeaters 151 and 152 in the fourth embodiment shown in FIG. 15 differ from the processing flow of the wireless relay device 100 in the first embodiment shown in FIG. 6 by performing additional step S202. Otherwise the processing flows of the two wireless LAN repeaters 151 and 152 are similar to the processing flow of the wireless relay device 100 in the first embodiment shown in FIG. 6, so that the same steps are expressed by the same step numbers and are not specifically described herein. The processing flows of the two wireless LAN repeaters 151 and 152 are the same as each other and the following describes only the processing flow of the wireless LAN repeater 151 as an example.

The wireless LAN repeater 151 or its access key sending module 20c determines whether the communication path by NFC established with the mobile communication terminal 201 is the first communication path established after the change (reset) of the access key (step S202). When it is determined that the established communication path is the first communication path established after the reset (step S202: YES), steps S205 to S245 are performed as described above (FIG. 6). When it is determined at step S202 that the established communication path is not the first communication path established after the reset (step S202: NO), on the other hand, the remote control process is terminated. Accordingly, in the first bedroom R11, only the mobile communication terminal 201 which has established the first communication path by NFC with the wireless LAN repeater 151 is available as the remote control for the lighting device 400c. Similarly, in the second bedroom R12, only the mobile communication terminal 202 which has established the first communication path by NFC with the wireless LAN repeater 152 is available as the remote control for the lighting device 400d.

The control system 10a of the fourth embodiment described above has similar advantageous effects to those of the control system 10 of the first embodiment. Additionally, in the control system 10a of the fourth embodiment, with respect to one identical room R100, all the mobile communication terminals 200, 201 and 202 are usable as the remote control in the living room R10. Only one mobile communication terminal (mobile communication terminal 201 or mobile communication terminal 202) is, on the other hand, usable as the remote control in each of the two bedrooms R11 and R12. This limits the mobile communication terminal usable as the remote control according to the usage situation of the room R100.

E. Fifth Embodiment

Figure 16:
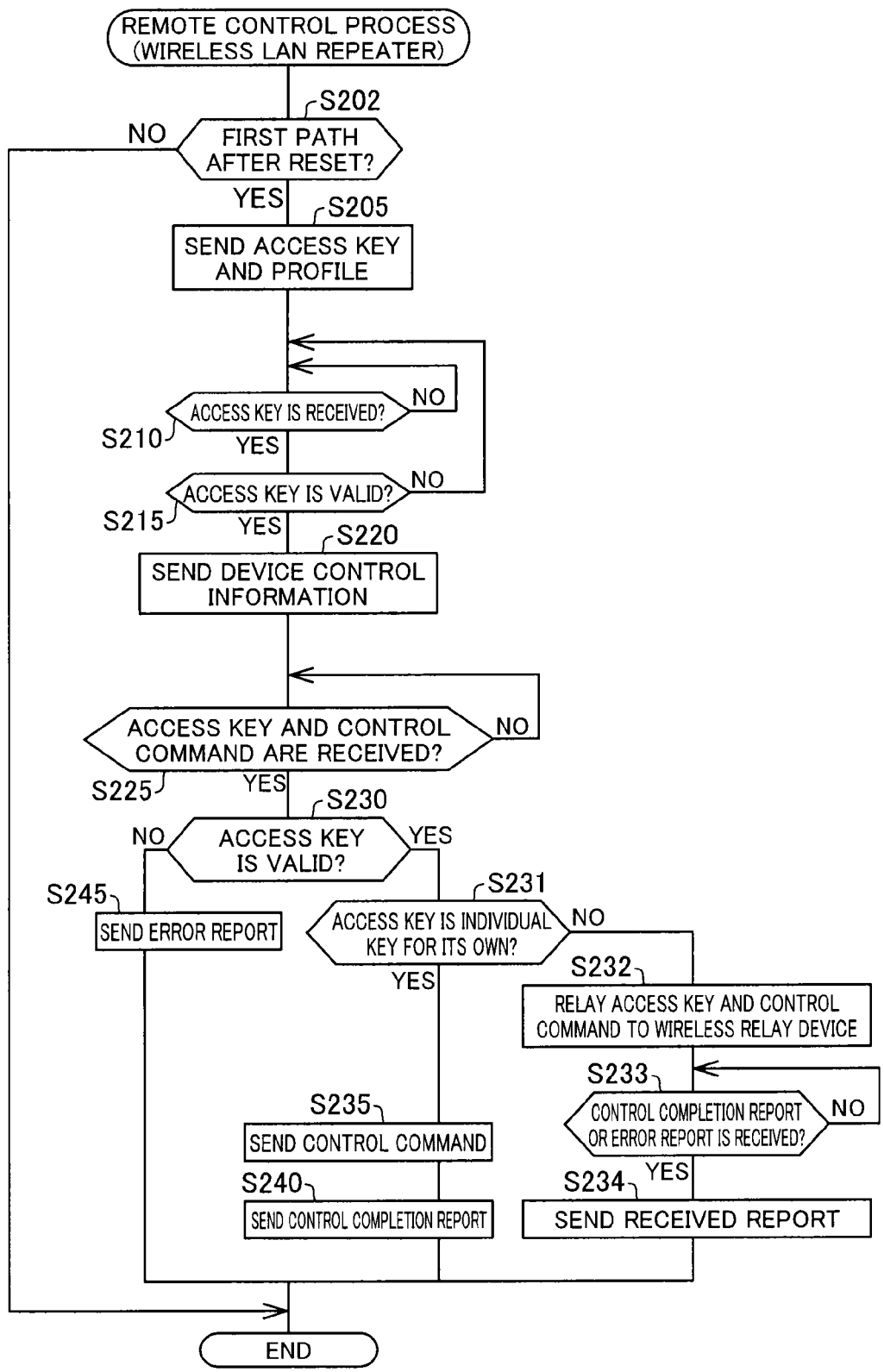
FIG. 16 is a flowchart showing a processing flow of two wireless LAN repeaters 151 and 152 in a remote control process according to a fifth embodiment.
Figure 17:
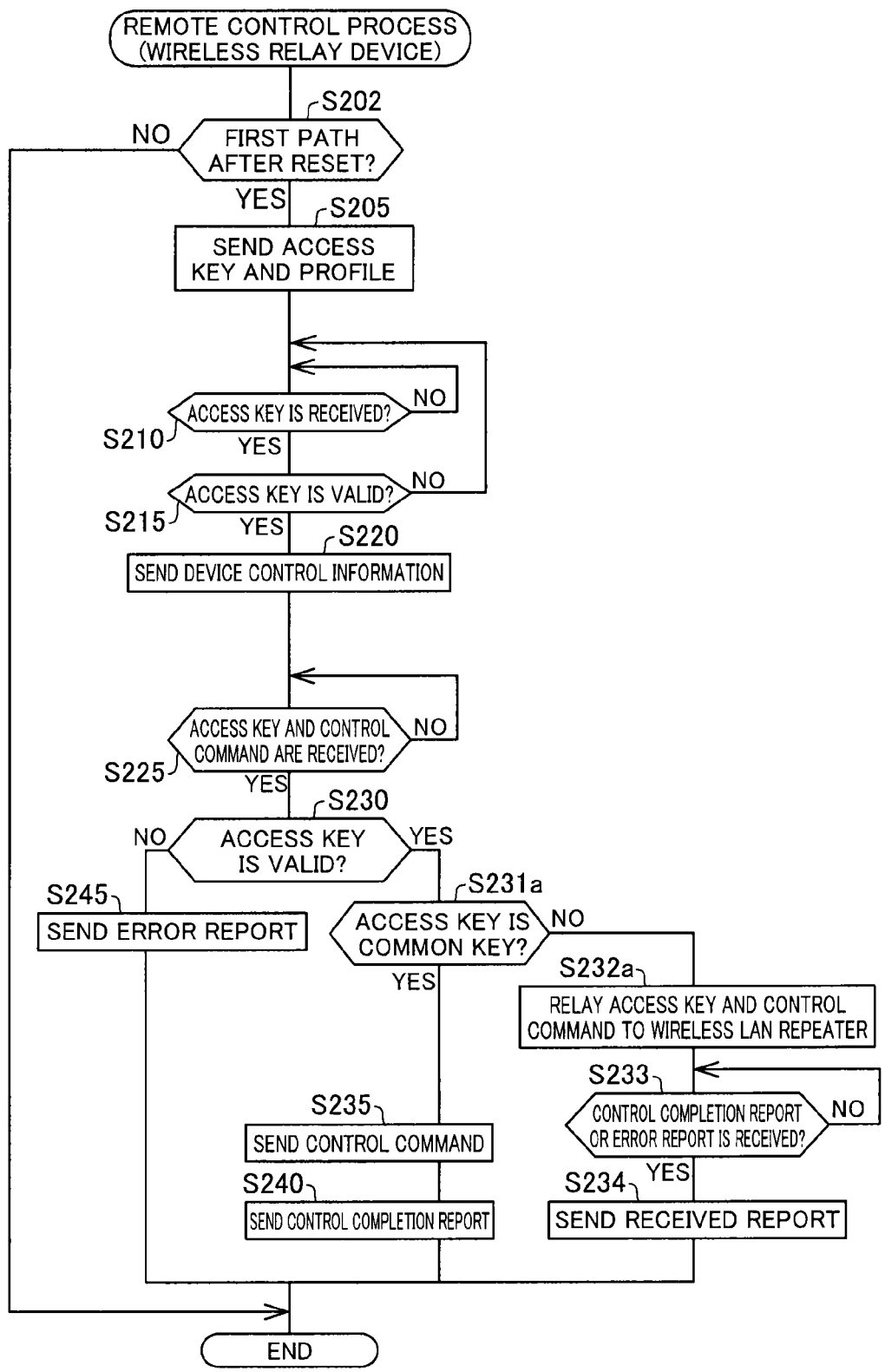
FIG. 17 is a flowchart showing a processing flow of a wireless relay device 100 in the remote control process according to the fifth embodiment.

FIG. 16 is a flowchart showing a processing flow of two wireless LAN repeaters 151 and 152 in a remote control process according to a fifth embodiment. FIG. 17 is a flowchart showing a processing flow of a wireless relay device 100 in the remote control process according to the fifth embodiment. A control system of the fifth embodiment has system configuration similar to the system configuration of the control system 10a of the fourth embodiment described above, so that the same components are expressed by the same numerical symbols and are not specifically described herein.

In the fourth embodiment described above, when the object devices to be controlled (lighting device 400a and air conditioner 400b) in the living room R10 are controlled by the mobile communication terminal 201 or by the mobile communication terminal 202, the access key and the control command output from the mobile communication terminal 201 or the mobile communication terminal 202 are directly received by the wireless relay device 100. When the lighting device 400c in the first bedroom R11 is controlled by the mobile communication terminal 201, the access key and the control command output from the mobile communication terminal 201 are directly received by the wireless LAN repeater 151. Similarly when the lighting device 400d in the second bedroom R12 is controlled by the mobile communication terminal 202, the access key and the control command output from the mobile communication terminal 202 are directly received by the wireless LAN repeater 152. In the fifth embodiment, however, the wireless relay device 100 may be allowed to receive an access key and a control command output from the mobile communication terminal 201 or the mobile communication terminal 202 via the wireless LAN repeater 151 or via the wireless LAN repeater 152. The wireless LAN repeater 151 or the wireless LAN repeater 152 may be allowed to receive an access key and a control command output from the mobile communication terminal 201 or the mobile communication terminal 202 via the wireless relay device 100. For example, when the user of the mobile communication terminal 201 in the first bedroom R11 operates the mobile communication terminal 201 for controlling the air conditioner 400b in the living room R10, a control command and an access key for controlling the air conditioner 400b are sent to the wireless relay device 100 via the wireless LAN repeater 151.

In the description below, access keys respectively sent by the wireless LAN repeaters 151 and 152 by using NFC (access key for the first bedroom R11 and access key for the second bedroom R12) are called "individual keys", and an access key sent by the wireless relay device 100 by using NFC (access key for the living room R10) is called "common key". In this embodiment, the wireless relay device 100 and the two wireless LAN repeaters 151 and 152 store in advance the individual key for the first bedroom R11, the individual key for the second bedroom R12 and the common key for the living room R10 set for the respective devices.

The flowchart shown in FIG. 16 differs from the flowchart of the fourth embodiment shown in FIG. 15 by additionally performing steps S231, S232, S233 and S234. The other steps are the same as those in the flowchart of the fourth embodiment, so that the same steps are expressed by the same step numbers and are not specifically described herein.

The cases of receiving the access key and the control command in the two wireless LAN repeaters 151 and 152 include the case of directly receiving from the mobile communication terminal 201 or the mobile communication terminal 202 and the case of receiving via the wireless relay device 100 (relayed by the wireless relay device 100). In either of the above two cases, it is determined at step S225 that the access key and the control command are received (step S225: YES). As described above, the respective individual keys and the common key are stored in advance in the two wireless LAN repeaters 151 and 152, so that it is determined at step S230 whether the access key received at step S225 is valid by comparison with the stored key.

When it is determined that the received access key is valid (step S230: YES), the control command relaying module 20b determines whether the received access key is the individual key for the own room (step S231). When it is determined that the received key is the individual key for the own room (step S231: YES), steps S235 and S240 described above are performed. When the access key and the control command are relayed by the wireless relay device 100 and are received, the control completion report at step S240 is not to be sent to the mobile communication terminal 201 or the mobile communication terminal 202 but is to be sent to the wireless relay device 100. Similarly the error report at step S245 is not to be sent to the mobile communication terminal 201 or the mobile communication terminal 202 but is to be sent to the wireless relay device 100.

When it is determined at above step S231 that the received access key is not the individual key for the own room (step S231: NO), the control command relaying module 20b relays the received access key and control command to the wireless relay device 100 (step S232). When receiving the access key and the control command relayed by the wireless LAN repeater 151 or the wireless LAN repeater 152, the wireless relay device 100 performs steps S235 to S245 as described later. As a result, the wireless relay device 100 sends either the control completion report or the error report to the wireless LAN repeater 151 or the wireless LAN repeater 152 as the source of the access key and the control command.

After performing above step S232, the control command relaying module 20b waits until either the control completion report or the error report is received from the wireless relay device 100 (step S233). When either the control completion report or the error report is received (step S233: YES), the control command relaying module 20b sends the received report to the mobile communication terminal 201 or the mobile communication terminal 202 as the source of the access key and the control command (step S234). In this way, in the process of controlling the lighting device 400a and the air conditioner 400b in the living room R10 by the mobile communication terminal 201 and the mobile communication terminal 202, the access key (common key) and the control command are relayed by the wireless LAN repeater 151 or the wireless LAN repeater 152 to reach the wireless relay device 100 and are then transferred from the wireless relay device 100 to the lighting device 400a and the air conditioner 400b. The control completion report or the error report output from the wireless relay device 100 is relayed by the wireless LAN repeater 151 or the wireless LAN repeater 152 to reach the mobile communication terminal 201 and the mobile communication terminal 202.

The processing flow of the remote control process by the wireless relay device 100 shown in FIG. 17 differs from the processing flow of the remote control process by the two wireless LAN repeaters 151 and 152 shown in FIG. 16 by performing step S231a in place of step S231 and performing step S232a in place of step S232. The other steps are the same as those shown in FIG. 16, so that the same steps are expressed by the same step numbers and are not specifically described herein.

The cases of receiving the access key and the control command at step S225 include the case of directly receiving from the mobile communication terminals 200, 201 and 202 and the case of receiving via the wireless LAN repeater 151 or the wireless LAN repeater 152 (relayed by the wireless LAN repeater 151 or the wireless LAN repeater 152). In either of the above two cases, it is determined at step S225 that the access key and the control command are received (step S225: YES). As described above, the respective individual keys and the common key are stored in advance in the wireless relay device 100, so that it is determined at step S230 whether the access key received at step S225 is valid by comparison with the stored key.

When it is determined that the received access key is valid (step S230: YES), the control command relaying module 20b determines whether the received access key is the common key for the living room R10 (step S231a). When it is determined that the received key is the common key for the living room R10 (step S231a: YES), steps S235 and S240 described above are performed. When the access key and the control command are relayed by the the wireless LAN repeater 151 or the wireless LAN repeater 152 and are received, the control completion report at step S240 is not to be sent to the mobile communication terminals 200, 201 and 202 but is to be sent to the wireless LAN repeater 151 or the wireless LAN repeater 152 as the source of the access key and the control command. Similarly the error report at step S245 is not to be sent to the mobile communication terminals 200, 201 and 202 but is to be sent to the wireless LAN repeater 151 or the wireless LAN repeater 152 as the source of the access key and the control command.

When it is determined at above step S231a that the received access key is not the common key for the living room R10 (step S231a: NO), the control command relaying module 20b relays the received access key and control command to the wireless LAN repeater 151 or the wireless LAN repeater 152 (step S232a). When the access key determined as valid at step S230 is identified as the individual key, the control command relaying module 20b identifies the wireless LAN repeater which the individual key is set for. At step S232a, the control command relaying module 20b relays the access key and the control command to the identified wireless LAN repeater.

As described above, when receiving the access key and the control command via the wireless relay device 100, the wireless LAN repeater 151 and the wireless LAN repeater 152 send the control completion report or the error report to the wireless relay device 100. Accordingly, the control command relaying module 20b of the wireless relay device 100 waits until the control completion report or the error report is received at step S233 and performs above step S234 in response to receiving. In this way, in the process of controlling the lighting device 400c in the first bedroom R11 by the mobile communication terminal 201, the access key (individual key) and the control command are relayed by the wireless relay device 100 to reach the wireless LAN repeater 151 and are then transferred from the wireless LAN repeater 151 to the lighting device 400c. Similarly in the process of controlling the lighting device 400d in the second bedroom R12 by the mobile communication terminal 202, the access key (individual key) and the control command are relayed by the wireless relay device 100 to reach the wireless LAN repeater 152 and are then transferred from the wireless LAN repeater 152 to the lighting device 400d. The control completion report or the error report output from the wireless LAN repeater 151 or the wireless LAN repeater 152 is relayed by the wireless relay device 100 to reach the mobile communication terminal 201 and the mobile communication terminal 202.

The control system 10a of the fifth embodiment described above has the similar advantageous effects to those of the control system 10a of the fourth embodiment. Additionally, the access key and the control command are relayed bi-directionally between the two wireless LAN repeaters 151 and 152 and the wireless relay device 100. For example, in the state that the mobile communication terminal 201 is placed in the first bedroom R11 and that wireless connection cannot be made between the mobile communication terminal 201 and the wireless relay device 100 but can be made between the mobile communication terminal 201 and the wireless LAN repeater 151, the mobile communication terminal 201 can be used to control the object devices to be controlled (lighting device 400a and air conditioner 400b) in the living room R10.

F. Modifications

F-1. Modification 1

The configurations of the control systems 10 and 10a of the respective embodiments described above are only illustrative and may be modified in various ways. For example, the hotel LAN 15 is a wired LAN in the respective embodiments but may be a wireless LAN instead of the wired LAN. Although proximity wireless communication using NFC is employed for communication between the wireless relay device 100 and the mobile communication terminal 200, between the mobile communication terminal 201 and the wireless LAN repeater 151 and between the mobile communication terminal 202 and the wireless LAN repeater 152 in the respective embodiments, near field communication having the relatively longer maximum coverage (approximately 100 m at the maximum) than that of the proximity wireless communication may be employed instead of the proximity wireless communication. For example, Bluetooth (registered trademark) may be employed for such wireless communication. The communication between the wireless relay device 100 and the lighting devices 400a, 400c and 400d and the air conditioner 400b is made by wireless communication in the respective embodiments but may be wired communication. More specifically, for example, any of various wired LANs specified in IEEE 802.3 standard group or any communication system of wired communication such as Ethernet (registered trademark) or PLC may be employed. In this configuration, the communication system in conformity with ECHONET Lite is preferable. Although the mobile communication terminal is a smartphone in the respective embodiments, the smartphone may be replaced by any mobile terminal having communication functions, such as a tablet PC, a laptop PC, or a mobile game machine. The management device 300 is implemented by the laptop PC but may be implemented by a desktop PC or an exclusive computer. Any wireless communication interface for wireless communication which is not limitedly performed by the wireless LAN conforming to IEEE 802.11a/b/g/n/ac but is performed by any of general wireless LANs available in the future may be employed for the wireless LAN communication control circuits 42 and 242. Any wireless communication interface for wireless communication which is not limitedly performed by mobile communication conforming to 3G/HSPA but is performed by any of mobile communication available in the future, for example, LTE (Long Term Evolution), next-generation mobile WiMAX (IEEE 802.16m) or next generation PHS (XGP: eXended Global Platform) may be employed for the mobile communication control circuit 243.

F-2. Modification 2

The object devices to be controlled in the first and the fourth embodiments are the lighting devices and the air conditioner, and the object devices to be controlled in the second and the third embodiments are the lighting device, the air conditioner and the TV set. The object devices to be controller are, however, not limited to these devices but may be any remote controllable devices such as refrigerator, a radio receiver and various media players including DVD player. The control items and the setting ranges of the object device to be controlled in the respective embodiments are not limited to the control items and the setting ranges described in FIG. 3 or FIG. 9.

F-3. Modification 3

The control commands are transmitted between the wireless relay device 100 and the mobile communication terminal 200 via the wireless LAN in the respective embodiments, but the disclosure is not limited to this configuration. For example, the hotel LAN 15 may be connected to a network of a common carrier via a non-illustrated gateway device, and the control commands may be transmitted via this network and a network of a mobile network operator to which the mobile communication control circuit 243 of the mobile communication terminal 200 is connectable. This enables the respective devices to be controlled over the network.

F-4. Modification 4

The access key change process in each of the embodiments sends the new access key from the management device 300 to the wireless relay device 100, but the disclosure is not limited to this configuration. For example, only an access key change command may be sent from the management device 300 to the wireless relay device 100, and the wireless relay device 100 may generate a new access key according to a specified rule and update the access key. In this modified configuration, the new access key after update may be sent from the wireless relay device 100 to the management device 300, and the management device 300 may update the stored access key by the access key update controller 312.

F-5. Modification 5

In the third embodiment, the primary guest is notified of the password at the timing of a check-in or at a different timing from the check-in, but the disclosure is not limited to this configuration. When the mobile communication terminal 200 recognized as primary receives a password together with an access key and a wireless communication profile from the wireless relay device 100, the received password may be displayed on the touch panel 230. In this configuration, the primary guest is notified of the password by seeding the touch panel 230 and is allowed to notify a secondary guest of this password. In this configuration, it is not required to notify the primary guest of the password at the timing of a check-in or at a different timing from the check-in.

F-6. Modification 6

In the remote control process of the first embodiment, the validity of the access key is determined in the wireless relay device 100 (step S215) by comparing the access key received from the mobile communication terminal 200 with the access key stored in the access key storage unit 30a, but the disclosure is not limited to this configuration. For example, the following configuration may be employed. A common operational expression may be set in advance for the mobile communication terminal 200 and the wireless relay device 100. The mobile communication terminal 200 may send a value obtained by an arithmetic operation according to the above operational expression using an access key received from the wireless relay device 100 by NFC, to the wireless relay device 100. The wireless relay device 100 may compare a value obtained by an arithmetic operation according to the above operational expression using the access key sent to the mobile communication terminal 200 with the value received from the mobile communication terminal 200 and determine the validity of the access key in the mobile communication terminal 200. Even when any malicious person illegally obtains an access key, for example, by eavesdropping of radio wave, this configuration prevents the malicious person from controlling the object device to be controlled.

F-7. Modification 7

In the first and the fourth embodiments, the device control information consists of the device type, the model number, the control item, the setting range and the control command. In the second and the third embodiments, the device control information consists of the control terminal, the device type, the model number, the control item, the setting range and the control command. The device control information of the disclosure is, however, not limited to these pieces of information. For example, the other pieces of information (for example, control item, setting range and control command in the first and the fourth embodiments) may be stored in advance in relation to the device type and the model number in the remote control application for the mobile communication terminals 200, 201 and 202, so that the device control information may consist of only the device type and the model number. In this configuration, notifying the device type and the model number from the wireless relay device 100 to the mobile communication terminals 200, 201 and 202 by proximity wireless communication enables the mobile communication terminals 200, 201 and 202 to identify the object device to be controlled and identify the control command to be used for controlling the object device to be controlled. For example, when the control system 10 or 10a has only one type of setting item with respect to the object device to be controlled and only one type of control command, the device type, the control item and the control command may be omitted from the device control information. When there is only one type of control command with respect to a control item, either the control item or the control command may be omitted. In this configuration, in the case that the control item is omitted, the control command included in the device control information corresponds to the "information regarding a controllable item with respect to the object device" of the claims. In general, any information including at least one of the device types, the control item and the setting range may thus be employed for the device control information.

F-8. Modification 8

In the respective embodiments, the management device 300 may be omitted. In this case, it is preferable to employ such a configuration that the access key setting module 20e autonomously changes the access key in the wireless relay device 100, the wireless LAN repeater 151 and the wireless LAN repeater 152. More specifically, for example, in one employable configuration, the access key setting module 20e may generate information including encrypted date data at noon every day as a new access key and store (overwrite) the new access key in the access key storage unit 30a. This configuration enables a different access key from the access key set for the mobile communication terminals 200, 201 and 202 of previous guests to be set in the mobile communication terminals 200, 201 and 202 of next guests who check in after the noon. Such autonomous change of the access key may be performed, for example, on every establishment of a communication path by NFC.

F-9. Modification 9

In the respective embodiments, the access key is information consisting of a predetermined number of digits and letters, but the disclosure is not limited to this configuration. For example, the date described above in Modification 8 or any pieces of information to limit the period of validity and the effective area of the access key, such as the time and the room number, may be included in the access key. Information encrypted by an encryption system such as RC4 or AES may be employed as the access key.

F-10. Modification 10

In the respective embodiments, the device control information with respect to the object devices to be controlled, for example, the lighting device 400*a*, is stored in advance by the system administrator in the device control information storage units 30*b* of the wireless relay device 100 and the wireless LAN repeaters 151 and 152, but the disclosure is not limited to this configuration. For example, information regarding an object device to be controlled which is placed in each room and a control command for controlling the corresponding object device to be controlled may be set in advance in the management device 300. The information regarding the object device and the control command may be sent from the management device 300 to the wireless relay device 100 when the wireless relay device 100 is installed in each room, and the wireless relay device 100 may store the received information as device control information. In the above configuration, the management server 300 may obtain the control command for controlling the object device from a server device on the Internet. The mobile communication terminal 200 may directly obtain the device control information from, for example, the lighting device 400*a* as the object to be controlled by infrared communication or wireless communication.

F-11. Modification 11

In the remote control process of the respective embodiments, after the control command is set to the object devices, for example, the lighting device 400*a* (step S235), the control completion report is (automatically) sent to the mobile communication terminals 200, 201 and 202 (step S240), but the disclosure is not limited to this configuration. For example, the processing of step S240 may be performed when an acknowledgement (ACK) is received from the lighting device 400*a* or the air conditioner 400*b* after step S235. The above processing of step S245 (sending the error report) may be performed in place of step S235 when no acknowledgement is received in a predetermined time period after execution of step S235 or when negative acknowledgement (NACK) is received. The error report may have different contents when the access key is invalid and when ACK is not received in the predetermined time period from the object device or when NACK is received from the object device to be controlled. This configuration enables the error report to be displayed in such a manner as to identify the cause of an error on the touch panel 230 in the mobile communication terminals 200, 201 and 202 at step S155.

F-12. Modification 12

In the second embodiment, transmission of the access key, the password and the wireless connection profile to the mobile communication terminals 200 by using NFC is determined depending on the result of determination of whether the communication path by NFC is the first communication path established after the change of the access key, but the disclosure is not limited to this configuration. For example, when (a group of) guests check in, at a hotel reception, the mobile communication terminal 200 of a representative guest may be registered as primary in the management device 300, and a unique identification number of the mobile communication terminal 200 may be sent in advance via the hotel LAN 15 to the wireless relay device 100 in a room where the guests are expected to stay. When the mobile communication terminal 200 of a guest entering the room is placed in the wireless relay device 100, the wireless relay device 100 may determine whether a unique identification number of the mobile communication terminal 200 matches with the previously received unique identification number of the mobile communication terminal 200 of the representative guest. The wireless relay device 100 may send the access key, the password and the wireless connection profile to the mobile communication terminal 200 by using NFC in the case of matching, while not sending (or sending only the access key and the wireless connection profile) in the case of mismatching.

F-13. Modification 13

In the fourth embodiment, the mobile communication terminal 201 is placed in proximity to the wireless relay device 100 as the remote control for the object devices to be controlled (lighting device 400*a* and air conditioner 400*b*) in the living room R10 and is placed first in proximity to the wireless LAN repeater 151 to be operated as the remote control for the object device (lighting device 400*c*) in the first bedroom R11, but the disclosure is not limited to this configuration. For example, the following configuration may be employed. The device control information for the object device (lighting device 400*c*) in the first bedroom R11 and the device control information for the object devices (lighting device 400*a* and air conditioner 400*b*) in the living room R10 may be stored in an identifiable manner in advance in the wireless LAN repeater 151. All the device control information stored in the wireless LAN repeater 151 may be sent by using NFC to the mobile communication terminal 201 (as primary) placed first in proximity to the wireless LAN repeater 151. Only the device control information for the object devices (lighting device 400*a* and air conditioner 400*b*) in the living room R10 may be sent, on the other hand, by using NFC to any mobile communication terminal placed second or subsequently in proximity to the wireless LAN repeater 151. Similarly the device control information for the object device (lighting device 400*d*) in the second bedroom R12 and the device control information for the object devices in the living room R10 may be stored in an identifiable manner in advance in the wireless LAN repeater 152, and the similar operations to those for the mobile communication terminal 201 described above may be performed. In this configuration, only the mobile communication terminal recognized as primary may be operated as the remote control for controlling the object device (lighting device 400*c* or lighting device 400*d*) in each of the two bedrooms R11 and R12. Additionally, the user places the mobile communication terminal 201 in proximity to the wireless LAN repeater 151, so as to operate the mobile communication terminal 201 as the remote control for the lighting device 400*a* and the air conditioner 400*b* in the living room R10. This does not need the operation of placing the mobile communication terminal 201 in proximity to the wireless relay device 100 in order to operate the mobile communication terminal 201 as the remote control for the lighting device 400*a* and the air conditioner 400*b* in the living room R10. Because of the same reason, this does not need the operation of placing the mobile communication terminal 202 in proximity to the wireless relay device 100 in order to operate the mobile communication terminal 202 as the remote control for the lighting device 400a and the air conditioner 400b in the living room R10.

F-14. Modification 14

In the second embodiment described above, the mobile communication terminal 200 recognized as primary has different object devices (different types of object devices to be controlled) from those of the other mobile communication terminals 200, but may have different control items or different setting ranges instead of the different object devices to be controlled. More specifically, for example, the mobile communication terminal 200 as primary may be allowed to control all the control items (operation, drive mode and target temperature) shown in FIG. 9 among the control items of the air conditioner 400b, while the mobile communication terminal 200 as non-primary may be allowed to control only the "operation" among the control items of the air conditioner 400b. In another example, the mobile communication terminal 200 as primary may be allowed to set (control) the entire setting range (1 to 15) shown in FIG. 9 in the setting range of the control item "channel" of the TV set, while the mobile communication terminal 200 as non-primary may be allowed to set (control 9 a limited range (for example, 1 to 5) in the setting range of the control item "channel" of the TV set. These examples may be achieved, for example, by mapping the control terminal to the control item or by mapping the control terminal to the setting range as well as mapping the control terminal to the device type as shown in FIG. 9 and controlling the contents of the device control information to be sent to each mobile communication terminal 200 at step S220a.

F-15. Modification 15

In the respective embodiments, the access key (and the password) and the control command are simultaneously sent to the wireless relay device 100 at step S145, but the disclosure is not limited to this configuration. The control command may be sent after the access key (and the password) are sent. Additionally, in this configuration, after the wireless relay device 100 determines that the received access key (and the password) are valid (step S230 or S230a), the control command may be sent to the wireless relay device 100. The control command sent from the mobile communication terminal 200 may be not necessarily the command itself for directly operating the lighting device 400a. For example, control information such as "lighting up" or "darkening" may be sent as the control command from the mobile communication terminal 200, and the wireless relay device 100 receiving this control command may interpret the control information, convert the control information into a command suitable for the lighting device 400a and send the command to the lighting device 400a. This allows for a conceptual operation separate from the direct command for the object device in the application program of the mobile communication terminal 200. For example, when a control command "softer light" is selected in the mobile communication terminal 200, the wireless relay device 100 may actually send a command for adjusting the emission color of lighting in combination with a command for changing the light intensity to the lighting device 400a.

In the respective embodiments, transmission of the access key (and the password) between the mobile communication terminals 200, 201 and 202 and the wireless relay device 100 is performed twice, i.e., at step S120 (S120a) and at step S145 (step S145a), but may be performed three or more times. In this configuration, it is preferable to send the device control information to the mobile communication terminals 200, 201 and 202 when the access key (and the password) received by the wireless relay device 100 by transmission at an earlier time are valid, and to send the control command to the object device (for example, the lighting device 400) when the access key (and the password) received by the wireless relay device 100 by transmission of a later time are valid.

F-16. Modification 16

In the remote control process of the fifth embodiment, the processing of step S230 may be omitted as needed. More specifically, for example, when the wireless LAN repeater 151 receives the access key and the control command from the wireless relay device 100 (step S225: YES in FIG. 16), the processing of step S225 in FIG. 17 has already been performed and it has been determined that the access key is valid in the wireless relay device 100. In this case, the processing flow may omit step S230 and proceed to step S231. Additionally, in this case, the wireless relay device 100 relays the access key and the control command to the wireless LAN repeater corresponding to the received access key. The access key which the wireless LAN repeater 151 receives from the wireless relay device 100 is accordingly the access key for the first bedroom R11. The processing flow may thus omit step S231 and proceed to steps S235 and S240. The processing of steps S230 and S231 performed in the wireless LAN repeater 152 may be similarly omitted. The processing of steps S230 and S231a performed in the wireless relay deice 100 may also be omitted.

F-17. Modification 17

In the fifth embodiment, the access key and the control command are relayed only between two devices, such as between the wireless LAN repeater 151 and the wireless relay device 100 and between the wireless LAN repeater 152 and the wireless relay device 100. In other words, the access key and the control command are relayed via only one link, but the disclosure is not limited to this configuration. The access key and the control command may be relayed via two links. More specifically, the access key and the control command may be relayed via a first link between the wireless LAN repeater 151 and the wireless relay device 100 and a second link between the wireless relay device 100 and the wireless LAN repeater 152. For example, in the state that the mobile communication terminal 202 is placed in the first bedroom R11, in response to the user's operation for controlling the lighting device 400d in the second bedroom R12, the access key and the control command output from the mobile communication terminal 201 may be received by the wireless LAN repeater 151, subsequently relayed to the wireless relay device 100 via the first link (between the wireless LAN repeater 151 and the wireless relay device 100) and further relayed to the wireless LAN repeater 152 via the second link (between the wireless relay device 100 and the wireless LAN repeater 152). The control command may be then sent from the wireless LAN repeater 152 to the lighting device 400d. This configuration allows the mobile communication terminal 200, 201 or 202 at any location in the room R100 to control the device in any room (living room R10, first bedroom R11 and second bedroom R12).

In the fifth embodiment, when there are a greater number of wireless LAN repeaters, the access key and the control command may be relayed not necessarily via two links but via three or more links. In this configuration, at least one wireless LAN repeater among the plurality of LAN repeaters may be a device configured not to control the object device, in other words, a device configured not to output the control command for the object device to the object device but configured to simply relay the access key and the control command.

Additionally, in the fifth embodiment, at least one of the wireless LAN repeaters 151 and 152 may be a device configured not to control the object device, in other words, a device configured not to output the control command for the object device to the object device but configured to simply relay the access key and the control command. In this configuration, for example, the mobile communication terminal 200 placed in the first bedroom R11 may send the access key and the control command to the wireless LAN repeater 151 to control the lighting device 400a in the living room R10, and the wireless LAN repeater 151 may simply relay the access key and the control command to the wireless relay device 100.

F-18. Modification 18

In the respective embodiments, part of the configuration implemented by hardware may be replaced by software, while part of the configuration implemented by software may be replaced by hardware. In the application that part or all of the functions of the disclosure is implemented by software, the software (computer program) may be provided in the form of storage in a computer readable storage medium. The "computer readable storage medium" is not limited to a portable storage medium such as flexible disk or CD-ROM but also includes internal storage devices in the computer such as various RAMs and ROMs as well as external storage devices fixed to the computer such as hard disk drives. In other words, the "computer readable storage medium" is used in a broad sense including any storage medium configured to fix data in a non-transitory manner.

F-19. Modification 19

The wireless relay device 100 may be operated as a router. Operating the wireless relay device 100 as a router enables the user to access the wireless relay device 100 from outside of the hotel LAN 15 (for example, via the Internet) and remote control the lighting device 400a and the air conditioner 400b.

F-20. Modification 20

The disclosure is applicable not only accommodation facilities such as hotels but various shops and event sites. For example, an expected situation is that the user uses the own mobile communication terminal as a controller for a game machine placed in the event site. In this case, the mobile communication terminal receives an access key by NFC communication and sends the received access key to the wireless relay device for authentication. The authenticated mobile communication terminal is operated as a controller for the game machine and outputs its motion as a control command for the game machine. When a previous player ends the game and a next player has a turn for the game, the access key is to be changed, so that the game machine is not affected even when the previous player with the mobile communication terminal continues staying in the event site.

The access key may be changed when the time elapsed since the start of the game reaches a predetermined time or when the frequency of game-overs reaches a predetermined number of times. As described in the second and the third embodiments, the plurality of mobile communication terminals 200 are easily usable as the game controllers and are thus readily applicable to a game machine for a plurality of players.

The disclosure is not limited to any of the embodiments and the modifications described herein but may be implemented by a diversity of other configurations without departing from the scope of the disclosure. For example, the technical features of the embodiments or modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein.

For example, according to one aspect of the disclosure, there is provided an electronic device for a control system that controls an object device to be controlled. The electronic device comprises circuitry that includes a first communication interface, a second communication interface, a third communication interface and an access key storage unit configured to store an access key, wherein the first communication interface configured to perform first communication that is proximity wireless communication with a mobile communication terminal that outputs a control command for controlling the object device, the second communication interface configured to perform second communication that is different from the proximity wireless communication with the mobile communication terminal, and the third communication interface configured to perform third communication with the object device, the circuitry configured to: send the access key to the mobile communication terminal by the first communication; when the access key is received from the mobile communication terminal by the second communication, determine whether the received access key is valid based on the access key stored in the access key storage unit; send the control command received from the mobile communication terminal by the second communication, to the object device by the third communication in the case that the received access key is valid, while not sending the received control command to the object device in the case that the received access key is invalid; and change the access key stored in the access key storage unit. The electronic device of this aspect does not send (relay) the control command which is received from the mobile communication terminal, to the object device to be controlled, as long as the access key received from the mobile communication terminal is invalid. Accordingly, approval or denial for controlling the object device to be controlled is controllable by using the access key. Additionally, the electronic device has the access key setting module configured to change the access key stored in the access key storage unit, so that the time period when the mobile communication terminal is available as the controller for the object device can be limited by changing the access key. The mobile communication terminal receives the access key from the electronic device by proximity wireless communication, so that the user can readily use the mobile communication terminal as the controller for the object device by simply placing the mobile communication terminal in proximity to the electronic device.

In the electronic device of the above aspect, the circuitry further includes a fourth communication interface configured to perform fourth communication with a management device included in the control system; and the circuitry further configured to change the access key stored in the access key storage unit according to an instruction received from the management device by the fourth communication. In the electronic device of this aspect, the access key stored in the electronic device is changed by sending the instruction from the management device to the electronic device by the fourth communication. Accordingly, approval or denial for using the mobile communication terminal as the remote control is controllable by the management device.

In the electronic device of the above aspect, the circuitry further configured to: receive the access key from the mobile communication terminal by the second communication before receiving the access key; determine whether the received access is valid; and send device control information for controlling the object device to the mobile communication terminal by the second communication in the case that the received access key is valid. In the electronic device of this aspect, when the access key received by the second communication is valid, the wireless relay deice sends the device control information to the mobile communication terminal as the source of the access key. This causes the device control information to be sent only to the mobile communication terminal which is placed by the user in proximity to the electronic device and is intended by the user to be used as the remote control. In other words, this prevents the device control information from being sent to any mobile communication terminal which is not intended by the user to be used as the remote control.

In the electronic device of any of the above aspects, the circuitry further configured to receive at least two different types of the access keys from a plurality of the mobile communication terminals, and pieces of the device control information sent to the plurality of mobile communication terminals differ from each other according to the types of the access keys. The electronic device of this aspect sends the device control information according to the type of the access key when the plurality of mobile communication terminals are used as the remote controls. Accordingly, using different types of access keys for the plurality of mobile communication terminals differs, for example, the type of the object device by the mobile communication terminal and the control item. Using the same type of access keys, on the other hand, equalizes the type of the object device to be controlled and the control item.

In the electronic device of any of the above aspects, the device control information includes at least one of model information of the object device, information regarding a controllable item with respect to the object device and information regarding a settable range of the item. The electronic device of this aspect sends at least one of the model information of the object device, the information regarding the controllable item with respect to the object device and the information regarding the settable range of the item to the mobile communication terminal. This accordingly enables the mobile communication terminal to identify at least one of the models of the object device, the controllable item and the settable range based on the received information and control the object device using the identified information.

What is claimed is:
1. A device, comprising:
circuitry configured to:
perform first communication that is proximity wireless communication with a communication device;
perform second communication that is different from the proximity wireless communication with the communication device;
perform third communication with an object device;
store a first access key;
send the first access key to the communication device by the first communication;
receive a second access key from the communication device by the second communication;
receive a control command for controlling the object device from the communication device by the second communication; and
send the received control command received from the communication device, to the object device by the third communication in the case that the received second access key is determined to be valid.
2. The device according to claim 1, wherein
the circuitry is configured to change the access key stored in the circuitry.

3. The device according to claim 2, wherein
the circuitry is configured to:
determine whether the first communication is performed for the first time after the first access key was changed; and
send the changed first access key and a first password to the communication device by the first communication.
4. The device according to claim 3, wherein the circuitry is configured to:
receive a second password from the communication device by the second communication; and
send the received control command received from the communication device, to the object device by the third communication in the case that the received second access key and the received second password are determined to be valid.
5. The device according to claim 4 wherein
the circuitry is configured to:
receive a third access key and a third password from the communication device by the second communication before receiving the second access key and the second password;
determine whether the received third access key is valid;
determine whether the received third password is valid; and
send device control information for controlling the object device to the communication device by the second communication in the case that the received third access key and the received password are determined to be valid.
6. The device according to claim 2, wherein
the circuitry is configured to:
perform fourth communication with another device; and
change the first access key stored in the circuitry according to an instruction received from the another device.
7. The device according to claim 1, wherein
the circuitry is configured to:
receive a third access key from the communication device by the second communication before receiving the second access key;
determine whether the received third access key is valid; and
send device control information for controlling the object device to the communication device by the second communication in the case that the received third access key is determined to be valid.
8. The device according to claim 7, wherein
the received control command is based on the device control information.
9. The device according to claim 7, wherein
the circuitry is configured to receive at least two different types of the second access keys from a plurality of the communication devices, and
pieces of the device control information sent to the plurality of communication devices differ from each other according to the types of the second access keys.
10. The device according to claim 7, wherein
the device control information includes at least one of model information of the object device, information regarding a controllable item with respect to the object device, and information regarding a settable range of the controllable item.
11. The device according to claim 1, wherein
the circuitry is configured to receive the second access key from the communication device by the second communication in a state where the first communication is cut off.

12. The device according to claim 1, wherein the circuitry is configured to determine whether the received second access key is valid based on the first access key stored in the circuitry.

13. The device according to claim 1, wherein the circuitry sends the received second access key to another device, and the another device determines whether the received second access key is valid.

14. The device according to claim 1, wherein the circuitry is configured to send the received control command to another device in the case that the received second access key is allocated to the another electronic device.

15. The device according to claim 1, wherein the circuitry is configured not to send the received control command to the object device in the case that the received access key is determined to be invalid.

16. The device according to claim 1, wherein the circuitry is configured to perform the second communication via at least one relay device.

17. The device according to claim 1, wherein the proximity wireless communication is one of NFC (Near Field Communication) or RFID (Radio Frequency Identification).

18. A method of controlling an object device, the method comprising:
performing first communication that is proximity wireless communication with a communication device;
performing second communication that is different from the proximity wireless communication with the communication device;
performing third communication with the object device;
storing a first access key;
sending the first access key to the communication device by the first communication;
receiving a second access key from the communication device by the second communication;
receiving a control command for controlling the object device from the communication device by the second communication; and
sending, using circuitry, the received control command received from the communication device, to the object device by the third communication in the case that the received second access key is determined to be valid.

19. A control system, comprising:
a mobile communication terminal configured to output a control command for controlling an object device; and
a wireless relay device including:
circuitry configured to:
perform first communication that is proximity wireless communication with the mobile communication terminal;
perform second communication that is different from the proximity wireless communication with the mobile communication terminal;
perform third communication with the object device;
store a first access key;
send the first access key to the mobile communication terminal by the first communication;
receive a second access key from the mobile communication terminal by the second communication;
receive the control command for controlling the object device from the mobile communication terminal by the second communication; and
send the received control command received from the mobile communication terminal, to the object device by the third communication in the case that the received second access key is determined to be valid.

20. The control system according to claim 19, comprising:
a plurality of the wireless relay devices, wherein
the plurality of wireless relay devices are used to control different object devices to be controlled,
different types of the first access keys are allocated to the plurality of wireless relay devices,
the plurality of wireless relay devices store the first access keys allocated to the plurality of wireless relay devices in relation to the respective wireless relay devices,
each of the plurality of wireless relay devices is configured to perform fourth communication with another wireless relay device of the plurality of wireless relay devices,
when each of the plurality of wireless relay devices receives the second access key from the mobile communication terminal by the second communication, the each wireless relay device determines whether the received second access key is valid based on each of the stored first access keys,
the each wireless relay device sends the control command received from the mobile communication terminal by the second communication, to the object device by the third communication, in the case that the received second access key is determined to be valid and is the access key allocated to the each wireless relay device,
the each wireless relay device sends the received control command to the another wireless relay device by the fourth communication, in the case that the received second access key is determined to be valid but is the access key allocated to the another wireless relay device, and
the each wireless relay device does not send the received control command to either the object device or the another wireless relay device, in the case that the received second access key is determined to be invalid.

* * * * *